(12) United States Patent
West et al.

(10) Patent No.: US 12,394,163 B2
(45) Date of Patent: Aug. 19, 2025

(54) OPTICAL ELEMENTS BASED ON POLYMERIC STRUCTURES INCORPORATING INORGANIC MATERIALS

(71) Applicant: Magic Leap, Inc., Plantation, FL (US)

(72) Inventors: Melanie Maputol West, San Francisco, CA (US); Christophe Peroz, Tokyo (JP); Mauro Melli, San Leandro, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/616,981

(22) Filed: Mar. 26, 2024

(65) Prior Publication Data
US 2024/0273839 A1    Aug. 15, 2024

Related U.S. Application Data

(63) Continuation of application No. 17/733,391, filed on Apr. 29, 2022, now Pat. No. 11,954,809, which is a
(Continued)

(51) Int. Cl.
*G06T 15/00* (2011.01)
*B29D 11/00* (2006.01)
(Continued)

(52) U.S. Cl.
CPC ........... *G06T 19/006* (2013.01); *B29D 11/00* (2013.01); *G02B 5/1814* (2013.01); *G02B 6/24* (2013.01);
(Continued)

(58) Field of Classification Search
CPC ......... G06T 19/00; G06T 17/20; G06T 17/00; G06T 15/10; G06T 15/00; G06T 13/40;
(Continued)

(56) References Cited

U.S. PATENT DOCUMENTS 6,850,221 B1    2/2005 Tickle
6,888,663 B2    5/2005 Bourdelais
(Continued)

FOREIGN PATENT DOCUMENTS

CN    1555308 A    12/2004
CN    1900750 A    1/2007
(Continued)

OTHER PUBLICATIONS

ARToolKit: https://web.archive.org/web/20051013062315/http://www.hitl.washington.edu:80/artoolkit/documentation/hardware.htm, archived Oct. 13, 2005, 3 pages.
(Continued)

*Primary Examiner* — Gordon G Liu
(74) *Attorney, Agent, or Firm* — Fish & Richardson P.C.

(57) ABSTRACT

The present disclosure relates to display systems and, more particularly, to augmented reality display systems. In one aspect, a method of fabricating an optical element includes providing a substrate having a first refractive index and transparent in the visible spectrum. The method additionally includes forming on the substrate periodically repeating polymer structures. The method further includes exposing the substrate to a metal precursor followed by an oxidizing precursor. Exposing the substrate is performed under a pressure and at a temperature such that an inorganic material comprising the metal of the metal precursor is incorporated into the periodically repeating polymer structures, thereby forming a pattern of periodically repeating optical structures configured to diffract visible light. The optical structures have a second refractive index greater than the first refractive index.

16 Claims, 21 Drawing Sheets

Related U.S. Application Data continuation of application No. 17/169,273, filed on Feb. 5, 2021, now Pat. No. 11,328,492, which is a continuation of application No. 16/236,140, filed on Dec. 28, 2018, now Pat. No. 10,916,060.

(60) Provisional application No. 62/613,651, filed on Jan. 4, 2018.

(51) Int. Cl.
| | | |
|---|---|---|
| G02B 5/18 | (2006.01) | |
| G02B 6/24 | (2006.01) | |
| G02B 27/01 | (2006.01) | |
| G02B 27/42 | (2006.01) | |
| G06F 3/16 | (2006.01) | |
| G06T 7/50 | (2017.01) | |
| G06T 19/00 | (2011.01) | |

(52) U.S. Cl.
CPC ..... *G02B 27/0103* (2013.01); *G02B 27/0172* (2013.01); *G02B 27/4205* (2013.01); *G06F 3/16* (2013.01); *G06T 7/50* (2017.01); *G02B 2027/0109* (2013.01); *G02B 2027/0123* (2013.01); *G02B 2027/014* (2013.01); *G02B 2027/0178* (2013.01)

(58) Field of Classification Search
CPC ......... G06T 15/06; G06T 15/08; G06T 15/20; G06T 15/04; G06T 2210/41; G06T 15/005; G06T 1/20; G06T 19/006; G06T 7/337; G06T 7/50; G06T 7/74; G06T 19/20; G06T 2200/04; G06T 2207/10016; G06T 2207/30244; G06T 2219/024; G06T 2219/2016; G06T 2210/12; G06T 2210/21; G06T 7/70; G06T 2207/20084; G06F 16/51; G06F 21/602; H04N 23/64; H04N 23/90; H04N 23/611; H04N 23/635; G06V 20/20
USPC ........................................................ 345/419
See application file for complete search history.

(56) References Cited

U.S. PATENT DOCUMENTS

| | | | |
|---|---|---|---|
| 9,081,426 B2 | 7/2015 | Armstrong | |
| 9,215,293 B2 | 12/2015 | Miller | |
| 9,348,143 B2 | 5/2016 | Gao et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| 9,740,006 B2 | 8/2017 | Gao | |
| 9,791,700 B2 | 10/2017 | Schowengerdt et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 10,527,851 B2 | 1/2020 | Lin et al. | |
| 10,916,060 B2 | 2/2021 | West et al. | |
| 2004/0175631 A1* | 9/2004 | Crocker | C23C 18/145 850/16 |
| 2006/0028436 A1 | 2/2006 | Armstrong | |
| 2006/0254502 A1* | 11/2006 | Garrou | C23C 18/208 117/84 |
| 2007/0081123 A1 | 4/2007 | Lewis | |
| 2009/0041971 A1 | 2/2009 | Wang et al. | |
| 2011/0056398 A1* | 3/2011 | Weiss | B41D 7/00 101/483 |
| 2011/0117637 A1 | 5/2011 | Gray et al. | |
| 2012/0127062 A1 | 5/2012 | Bar-Zeev et al. | |
| 2012/0162549 A1 | 6/2012 | Gao et al. | |
| 2012/0194911 A1 | 8/2012 | Li et al. | |
| 2012/0206446 A1 | 8/2012 | Yamazaki et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0072720 A1* | 3/2014 | Watkins | G02B 1/118 252/521.1 |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2014/0306866 A1 | 10/2014 | Miller et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0235436 A1 | 8/2015 | Schowengerdt | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0339733 A1 | 11/2016 | Holmes | |
| 2017/0131460 A1 | 5/2017 | Lin et al. | |
| 2017/0307886 A1 | 10/2017 | Stenberg et al. | |
| 2017/0322418 A1* | 11/2017 | Lin | G02B 27/0172 |
| 2018/0081176 A1 | 3/2018 | Olkkonen et al. | |
| 2018/0231702 A1 | 8/2018 | Lin et al. | |
| 2019/0206136 A1 | 7/2019 | West et al. | |
| 2020/0150437 A1 | 5/2020 | Lin | |

FOREIGN PATENT DOCUMENTS

| | | |
|---|---|---|
| CN | 102272973 A | 12/2011 |
| CN | 103890637 A | 6/2014 |
| JP | 2004535514 A | 11/2004 |
| JP | 2006-500763 | 1/2006 |
| JP | 2007057622 A | 3/2007 |
| JP | 2013-205512 | 10/2013 |
| JP | 2016151030 A | 8/2016 |
| JP | 2017-167534 | 9/2017 |
| WO | WO 2017/119400 | 7/2017 |
| WO | WO 2019/136008 | 7/2019 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995, 262 pages.

Bimber, et al., "Spatial Augmented Reality—Merging Real and Virtual Worlds," 2005, https://web.media.mit.edu/~raskar/book/BimberRaskarAugmentedRealityBook.pdf, 393 pages.

Heideman, et al., "High quality ZnO layers with adjustable refractive indices for integrated optics applications," Optical Materials 4, Oct. 1995, 4(1995):741-755.

International Preliminary Report on Patentability for PCT Application No. PCT/US18/68025, issued Jul. 7, 2020 (MLEAP.107WO), 8 pages.

International Search Report and Written Opinion for PCT Application No. PCT/US 18/68025, mailed May 14, 2019 (MLEAP.107WO), 12 pages.

Invitation to Pay Additional Fees and, Where Applicable, Protest Fee for PCT Application No. PCT/US18/68025, mailed Mar. 21, 2019 (MLEAP.107WO), 3 pages.

Jacob, "Eye Tracking in Advanced Interface Design," Human-Computer Interaction Lab Naval Research Laboratory, Washington,

(56) References Cited

OTHER PUBLICATIONS

D.C. /paper/in Virtual Environments and Advanced Interface Design, ed. by W. Barfield and T.A. Furness, pp. 258-288, Oxford University Press, New York (1995), 50 pages.

King, et al., "$TiO_2$ Inverse Opals Fabricated Using Low-Temperature Atomic Layer Deposition**," Adv. Mater., 2005, 17(8):1010-1013.

Kukli, et al., "Atomic layer deposition of zirconium oxide from zirconium tetraiodide, water and hydrogen peroxide," Journal of Crystal Growth, 2021, 231(1-2):262-272.

Lorenzoni et al., "Assessing the Local Nanomechanical Properties of Self-Assembled Block Copolymer Thin Films by Peak Force Tapping," American Chemical Society, Langmuir 2015, 31, 11630-11638.

Musgrave, et al., Precursors for Atomic Layer Deposition of High-k Dielectrics, Process Gasses, Chemicals and Materials, 2017, Section 7:3 pages.

Ocola et al., "Photoluminescence of Sequential Infiltration Synthesized ZnO nanostructures," Proc. of SPIE, 2016, vol. 9755, 6 pages.

Office Action in Japanese Appln. No. 2020-533007, dated Dec. 1, 2022, 7 pages (with English translation).

Peng, et al., "Nanoscopic Patterned Materials with Tunable Dimensions via Atomic Layer Deposition on Block Copolymers," Adv. Mater. 2010, 22, 5129-5133.

Ruiz, et al., "Image quality and pattern transfer in directed self assembly with block-selective atomic layer deposition," J. Vac. Sci. Technol., 2012, B30(06F202): 7 pages.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Tseng, et al., "Etch properties of resists modified by sequential infiltration synthesis," J. Vac. Sci. Technol., Nov. 2011, B29(6): 4 pages.

Tulio et al., "Structure and refractive index of thin alumina films grown by atomic layer deposition," J Mater Sci: Mater Electron (2015) 26:5546-5552.

Yin et al., "Highly ordered $TiO2$ nanostructures by sequential vapour infiltration of block copolymer micellar films in an atomic layer deposition reactor," J. Mater. Chem. C, 2013, 1, 1029-1036.

Office Action in Japanese Appln. No. 2024-010118, mailed on Dec. 26, 2024, 9 pages (with English translation).

González-Vila et al., "Molecularly imprinted electropolymerization on a metal-coated optical fiber for gas sensing applications," Sensors and Actuators B Accepted Manuscript, doi: 10.1016/j.snb.2017.01.084, published online Dec. 1, 2017; published in final edited form as: Sensors and Actuators B: Chemical, Jun. 2017, 244:1145-1151, 22 pages.

Office Action in Chinese Appln. No. 201880088917.8, mailed on Feb. 15, 2025, 7 pages (with English translation).

\* cited by examiner

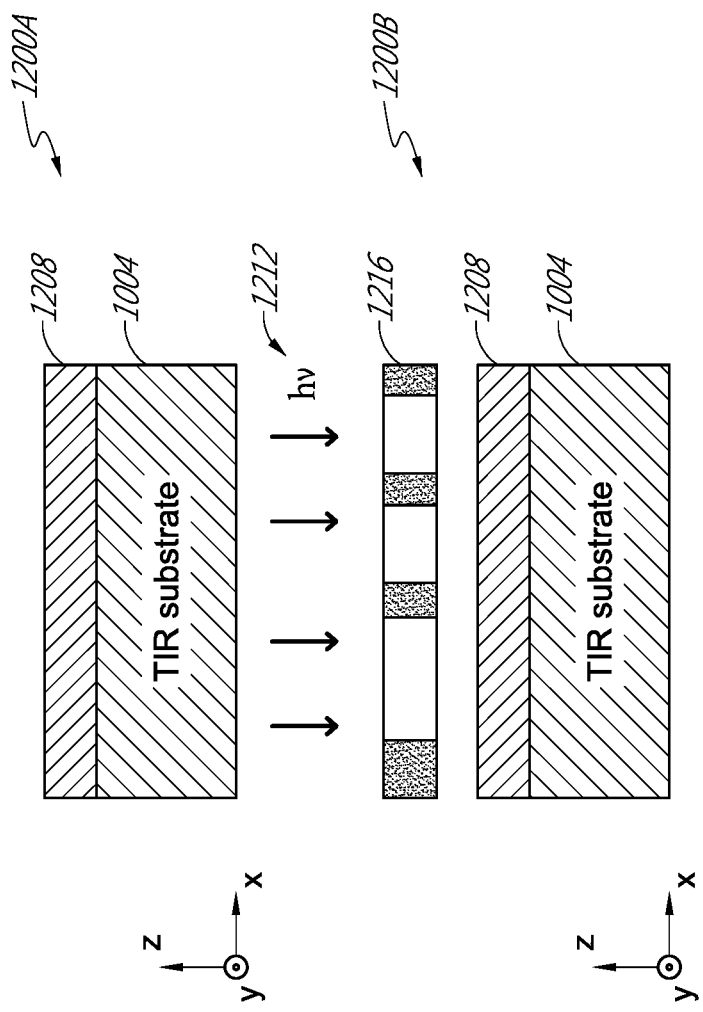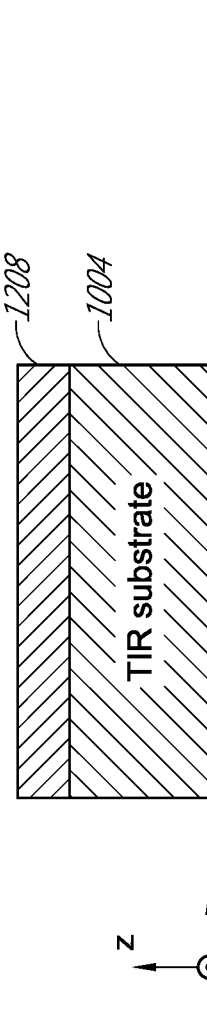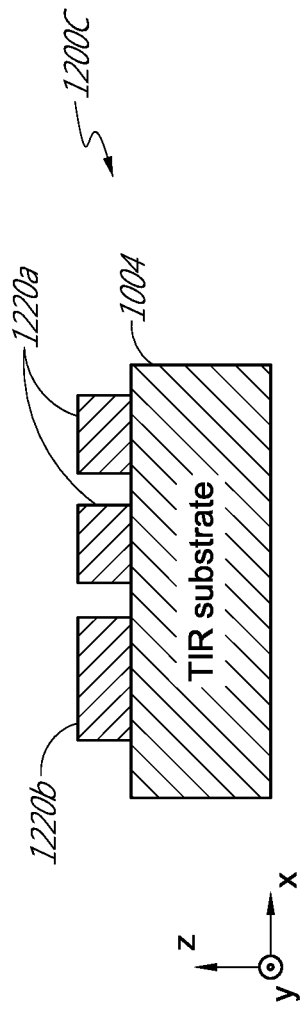

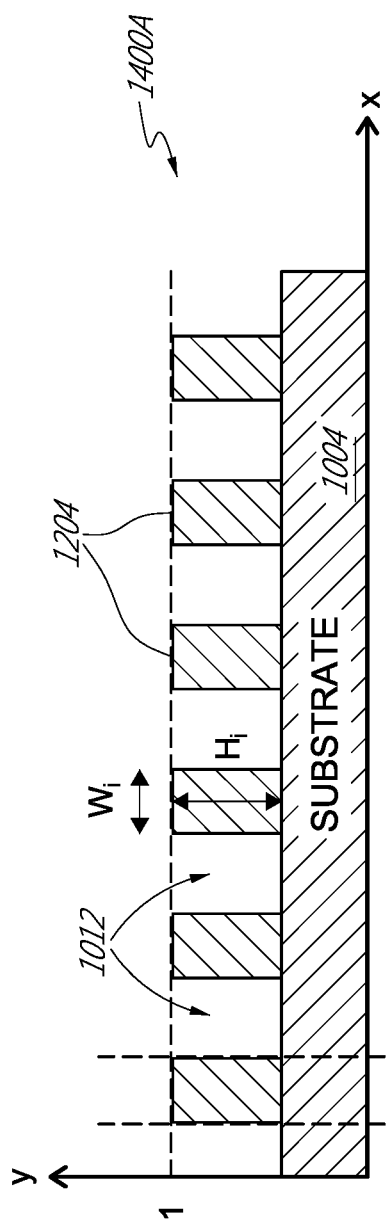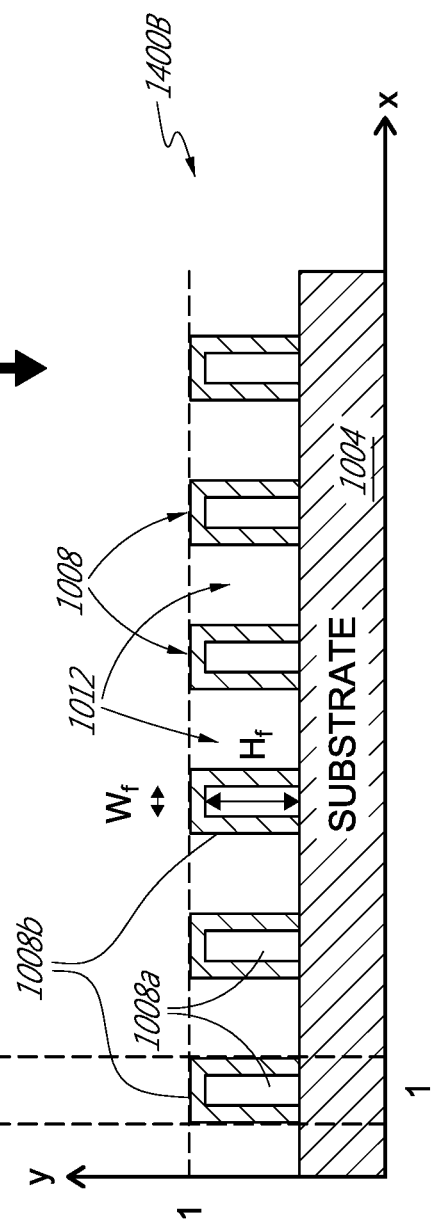

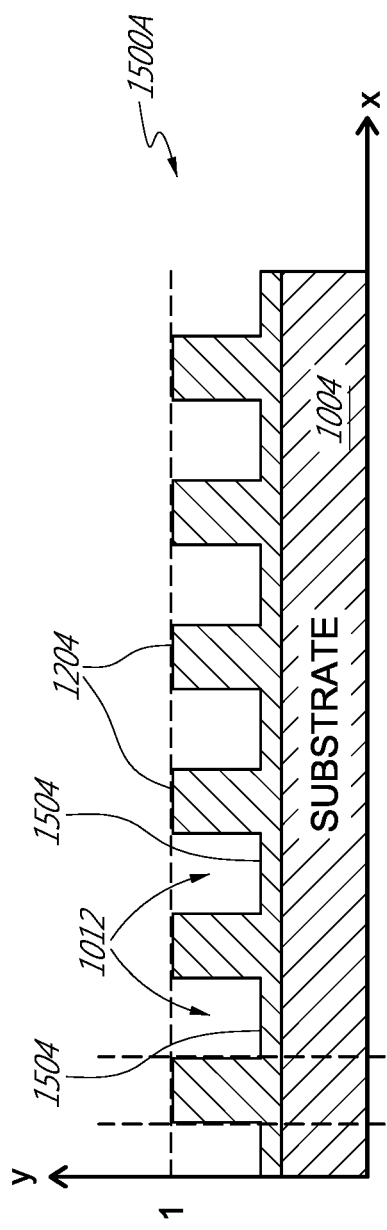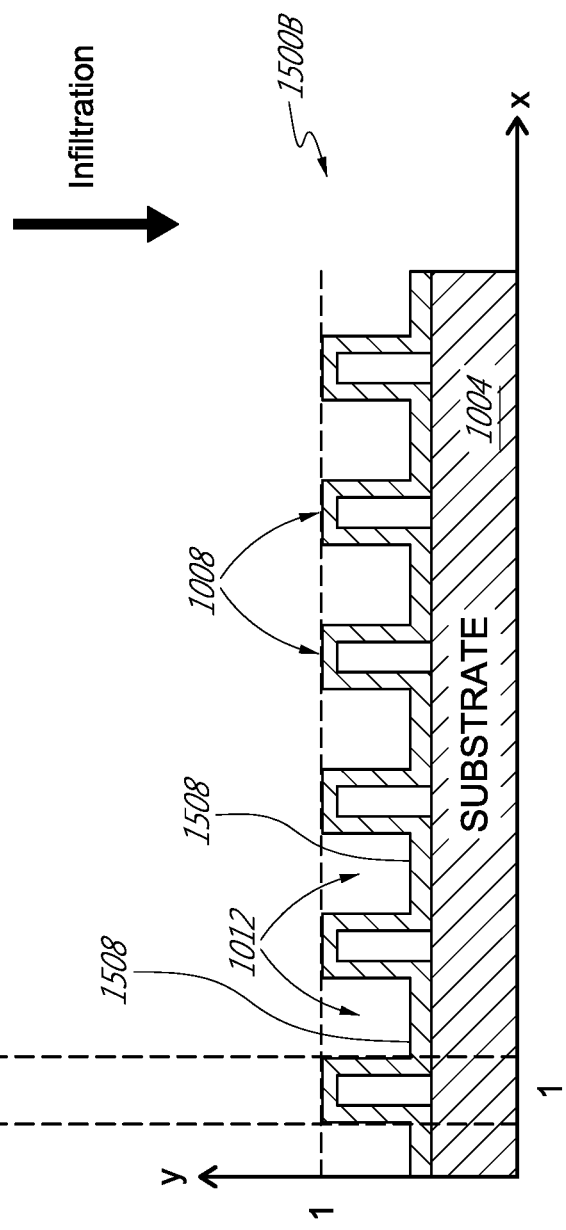
FIG. 15A
FIG. 15B

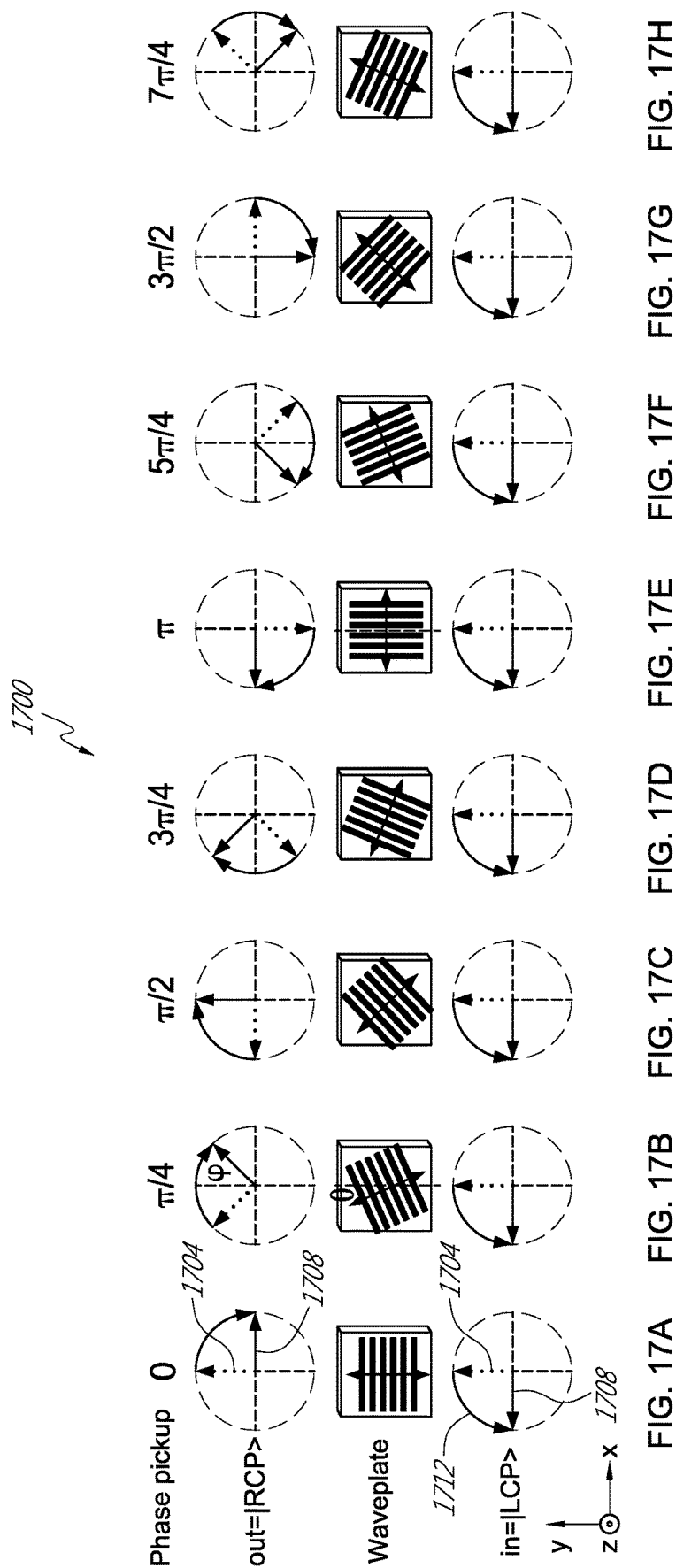

OPTICAL ELEMENTS BASED ON POLYMERIC STRUCTURES INCORPORATING INORGANIC MATERIALS

CROSS-REFERENCE TO RELATED APPLICATIONS

This application is a continuation of U.S. application Ser. No. 17/733,391, filed Apr. 29, 2022, entitled "OPTICAL ELEMENTS BASED ON POLYMERIC STRUCTURES INCORPORATING INORGANIC MATERIALS," which is a continuation of U.S. application Ser. No. 17/169,273, filed Feb. 5, 2021, entitled "OPTICAL ELEMENTS BASED ON POLYMERIC STRUCTURES INCORPORATING INORGANIC MATERIALS," now U.S. Pat. No. 11,328,492, which is continuation of U.S. application Ser. No. 16/236,140, filed Dec. 28, 2018, entitled "OPTICAL ELEMENTS BASED ON POLYMERIC STRUCTURES INCORPORATING INORGANIC MATERIALS," now U.S. Pat. No. 10,916,060, which claims the benefit of priority to U.S. Provisional Patent Application No. 62/613,651, filed Jan. 4, 2018, entitled "OPTICAL ELEMENTS BASED ON POLYMERIC STRUCTURES INCORPORATING INORGANIC MATERIALS," the contents of which is are hereby incorporated by reference herein in their entirety.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; and U.S. application Ser. No. 14/331,218 filed on Jul. 14, 2014, published on Oct. 29, 2015 as U.S. Publication No. 2015/0309263.

BACKGROUND

Field

The present disclosure relates to display systems and, more particularly, to augmented reality display systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 1 is depicted. The user of an AR technology sees a real-world park-like setting 20 featuring people, trees, buildings in the background, and a concrete platform 30. The user also perceives that he "sees" "virtual content" such as a robot statue 40 standing upon the real-world platform 1120, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

In a first aspect, a method of fabricating an optical element includes providing a substrate having a first refractive index and transparent in the visible spectrum. The method additionally includes forming on the substrate periodically repeating polymer structures. The method further includes exposing the substrate to a metal precursor followed by an oxidizing precursor. Exposing the substrate is performed under a pressure and at a temperature such that an inorganic material comprising the metal of the metal precursor is incorporated into the periodically repeating polymer structures, thereby forming a pattern of periodically repeating optical structures configured to diffract visible light. The optical structures have a second refractive index greater than the first refractive index.

In a second aspect, an optical element includes a substrate having a first refractive index and transparent in the visible spectrum. The optical element additionally includes a pattern of periodically repeating optical structures formed on the substrate and configured to diffract visible light. The optical structures have a second refractive index greater than the first refractive index and include a polymeric material having incorporated therein an inorganic material.

In a third aspect, an optical system includes an optical element. The optical element includes a substrate having a first refractive index and transparent in the visible spectrum. The optical element additionally includes a pattern of periodically repeating optical structures formed on the substrate and configured to diffract visible light. The optical structures have a second refractive index greater than the first refractive index and include a polymeric material having incorporated therein an inorganic material. The periodically repeating optical structures include nanobeams arranged as a metasurface. The metasurface includes a plurality of repeating unit cells, where each unit cell includes a first set of nanobeams formed by one or more first nanobeams and a second set of nanobeams formed by one or more second nanobeams disposed adjacent to the one or more first nanobeams and separated from each other by a sub-wavelength spacing. The one or more first nanobeams and the plurality of second nanobeams are elongated in different orientation directions.

In a fourth aspect, an optical system includes a waveguide configured to propagate visible light. The optical system includes a substrate having a first refractive index and transparent in the visible spectrum such that light can be guided therein by total internal reflection. The optical system additionally includes a pattern of periodically repeating optical structures formed on the substrate and configured to diffract visible light. The optical structures have a second refractive index greater than the first refractive index and include a polymeric material having incorporated therein an inorganic material. The periodically repeating optical structures are arranged to diffract light at a diffraction angle relative to the direction of an incident light and to cause the diffracted light to propagate in the substrate under total internal reflection or are arranged to diffract light guided within the substrate under total internal reflection at a diffraction angle relative to the direction of light guided within the substrate.

In a fifth aspect, a head-mounted display device is configured to project light to an eye of a user to display augmented reality image content. The head-mounted display device includes a frame configured to be supported on a head of the user. The head-mounted display device additionally includes a display disposed on the frame, where at least a portion of the display includes one or more waveguides. The one or more waveguides are transparent and disposed at a location in front of the user's eye when the user wears the head-mounted display device such that the transparent portion transmits light from a portion of an environment in front of the user to the user's eye to provide a view of the portion of the environment in front of the user. The head-mounted display device additionally includes one or more light sources and at least one diffraction grating configured to couple light from the light sources into the one or more waveguides or to couple light out of the one or more waveguides. The at least one diffraction grating includes a substrate having a first refractive index and transparent in the visible spectrum. The at least one diffraction grating additionally includes a pattern of periodically repeating optical structures formed on the substrate and configured to diffract visible light. The optical structures have a second refractive index greater than the first refractive index and include a polymeric material having incorporated therein an inorganic material.

In a sixth aspect, a method of fabricating an optical element includes providing a substrate transparent in the visible spectrum, forming on the substrate periodically repeating polymer structures having a first refractive index, and exposing the substrate to a metal precursor followed by an oxidizing precursor. Exposing is performed under a pressure and at a temperature such that an inorganic material comprising the metal of the metal precursor is incorporated into the periodically repeating polymer structures, thereby increasing the refractive index of the periodically repeating polymer structures to form a pattern of periodically repeating optical structures configured to diffract visible light.

In a seventh aspect, a method of fabricating an optical element comprises providing a substrate having a first refractive index and transparent in the visible spectrum, wherein the substrate has formed thereon periodically repeating polymer structures. The method additionally includes exposing the substrate to a metal precursor followed by an oxidizing precursor. Exposing is performed under a pressure and at a temperature such that an inorganic material comprising the metal of the metal precursor is incorporated into the periodically repeating polymer structures, thereby forming a pattern of periodically repeating optical structures configured to diffract visible light, where the optical structures have a second refractive index greater than the first refractive index.

BRIEF DESCRIPTION OF THE DRAWINGS

FIGS. 12A-12C are cross-sectional views of intermediate structures at various stages of providing, using a photolithographic process, periodically repeating base polymer structures.

FIGS. 14A-14B are cross-sectional views of intermediate structures at various stages of fabrication of an optical element comprising periodically repeating polymer-based optical structures having incorporated therein an inorganic material.

FIGS. 15A-15B are cross-sectional views of intermediate structures at various stages of fabrication of an optical element comprising periodically repeating polymer-based optical structures having incorporated therein an inorganic material.

FIGS. 17A-17H illustrate an optical element comprising a plurality of waveplate elements, where each waveplate element comprises a pattern of periodically repeating polymer-based optical structures having incorporated therein an inorganic material, with respect to changes in polarization vectors of an incident light corresponding to rotations in the fast axes of the waveplate elements by an angle θ of 0, π/4, π/2, 3π/4, π, 5π/4, 3π/2 and 7π/4, respectively.

DETAILED DESCRIPTION

Figure 1:
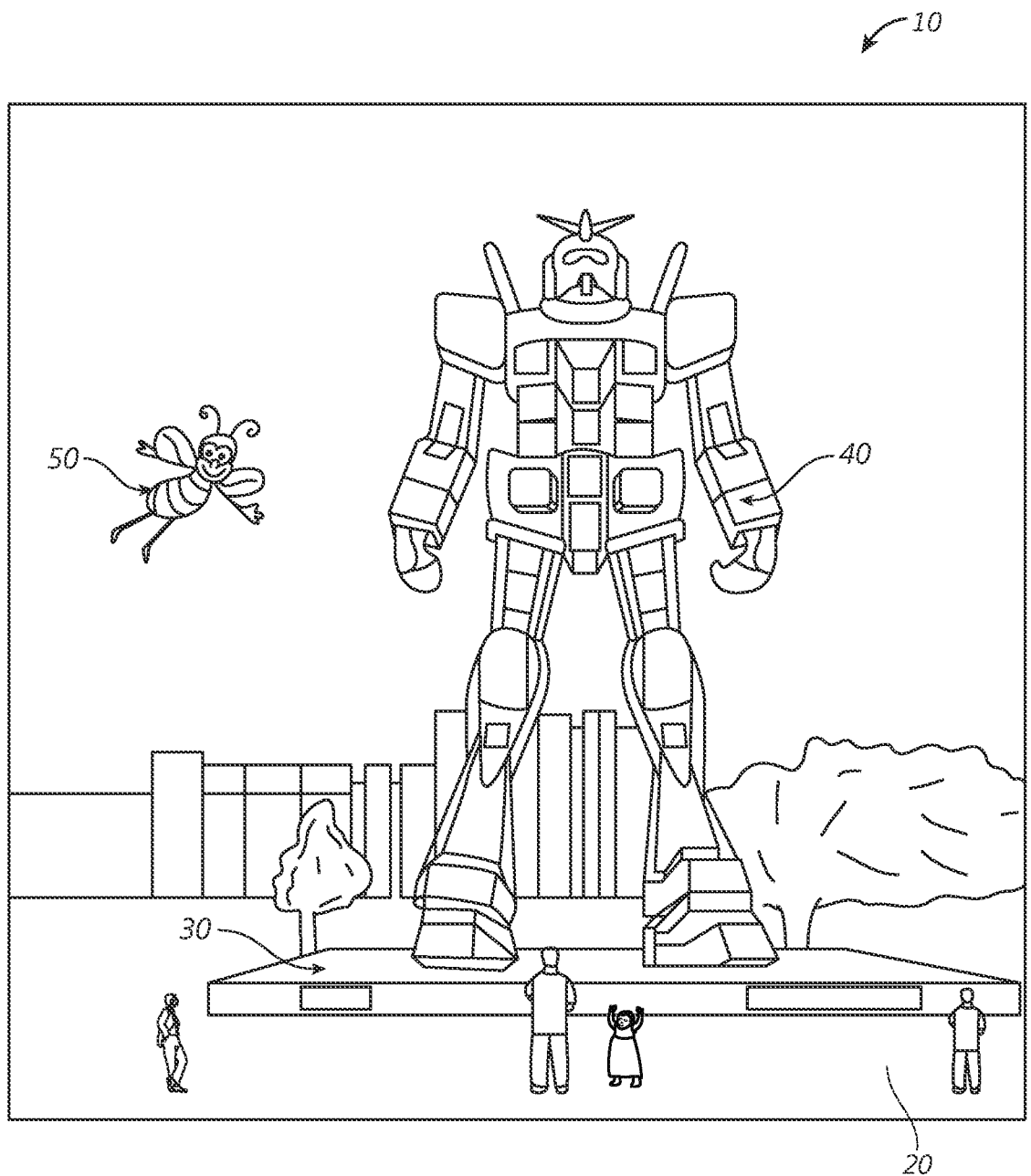
FIG. 1 illustrates a user's view of augmented reality (AR) through an AR device.

Optical systems, such as display systems, often utilize optical elements to control the propagation of light. In some applications, due to demand for compact optical systems, optical elements having reduced dimensions (e.g., thin structures) can be useful. Such optical elements may include, for example, diffractive optical elements.

An example diffractive optical element is a diffractive grating for coupling light into a light guide, e.g., a waveguide. The light guide may have, for example, disposed thereon or therein, a diffraction grating configured to couple light incident on the light guide, e.g., at normal incidence, into the light guide at an angle such that the diffracted light is guided within the light guide by total internal reflection. A diffractive optical element such as a diffraction grating may be included in or on the light guide to couple light guided within the light guide by total internal reflection out of the light guide. A diffractive optical element may also be used to manipulate, e.g., redirect and/or modify the beam of light propagating within the light guide by total internal reflection. Methods such as described herein for fabricating such diffractive optical elements that also provide increased confinement of light within the light guides and/or increase diffraction efficiency can be useful.

Such diffractive optical elements may comprise a pattern of periodically repeating optical structures formed on a substrate and configured to diffract visible light, where the optical structures have a refractive index greater than the refractive index of the substrate. The diffractive optical elements are formed of a polymeric material having incorporated therein an inorganic material. The polymeric material in some cases can serve a photoresist which remains as final optical structures, and can significantly reduce fabrication complexity. Incorporation of the inorganic material in the optical structures potentially allows for versatile tuning of optical properties, e.g., refractive index, and mechanical properties, e.g., stiffness. The inorganic material can be incorporated using atomic layer deposition, which can enable precise control of the amount and depth of incorporation in the optical structures.

Another approach to provide compact optical elements includes using thin films, e.g., diffraction gratings based on metasurfaces formed of thin film-based nanostructures. Metasurfaces, or metamaterial surfaces, provide opportunities to realize virtually flat, aberration-free optics on much smaller scales, in comparison with geometrical optics. Without being limited by theory, in some embodiments, metasurfaces include dense arrangements of surface structures that function as resonant optical antennas. The resonant nature of the light-surface structure interaction provides the ability to manipulate optical wave-fronts. In some cases, the metasurfaces may allow the replacement of bulky or difficult to manufacture optical components with thin, relatively planar elements formed by simple patterning processes. However, fabrication of thin film-based optical elements may include patterning metals or high-index dielectric materials by lithographically or nanoimprinting, both of which can be expensive and/or difficult to implement for structures having small dimensions and/or complex shapes.

Advantageously, the polymer-based optical structures having inorganic material incorporated therein can be configured as metasurfaces for forming various optical elements, including diffractive gratings. The metasurfaces may take the form of a grating formed by a plurality of repeating unit cells. Each unit cell may comprise two sets or more of nanobeams elongated in crossing directions: one or more first nanobeams elongated in a first direction and a plurality of second nanobeams elongated in a second direction different from the first direction.

Some diffractive optical elements, e.g., diffractive optical elements including metasurfaces formed of the polymer-based optical structures may be utilized in wearable display systems to provide compact optical elements. Augmented reality systems may display virtual content to a user, or viewer, while still allowing the user to see the world around them. This content can be displayed on a head-mounted display, which may be mounted on the head of a viewer. The head-mounted display may, for example, be part of eyewear, and project image information to the user's eyes. In addition, the display may also transmit light from the surrounding environment to the user's eyes, to allow a view of that surrounding environment.

Reference will now be made to the drawings, in which like reference numerals refer to like parts throughout.

Example Display Systems

Figure 2:
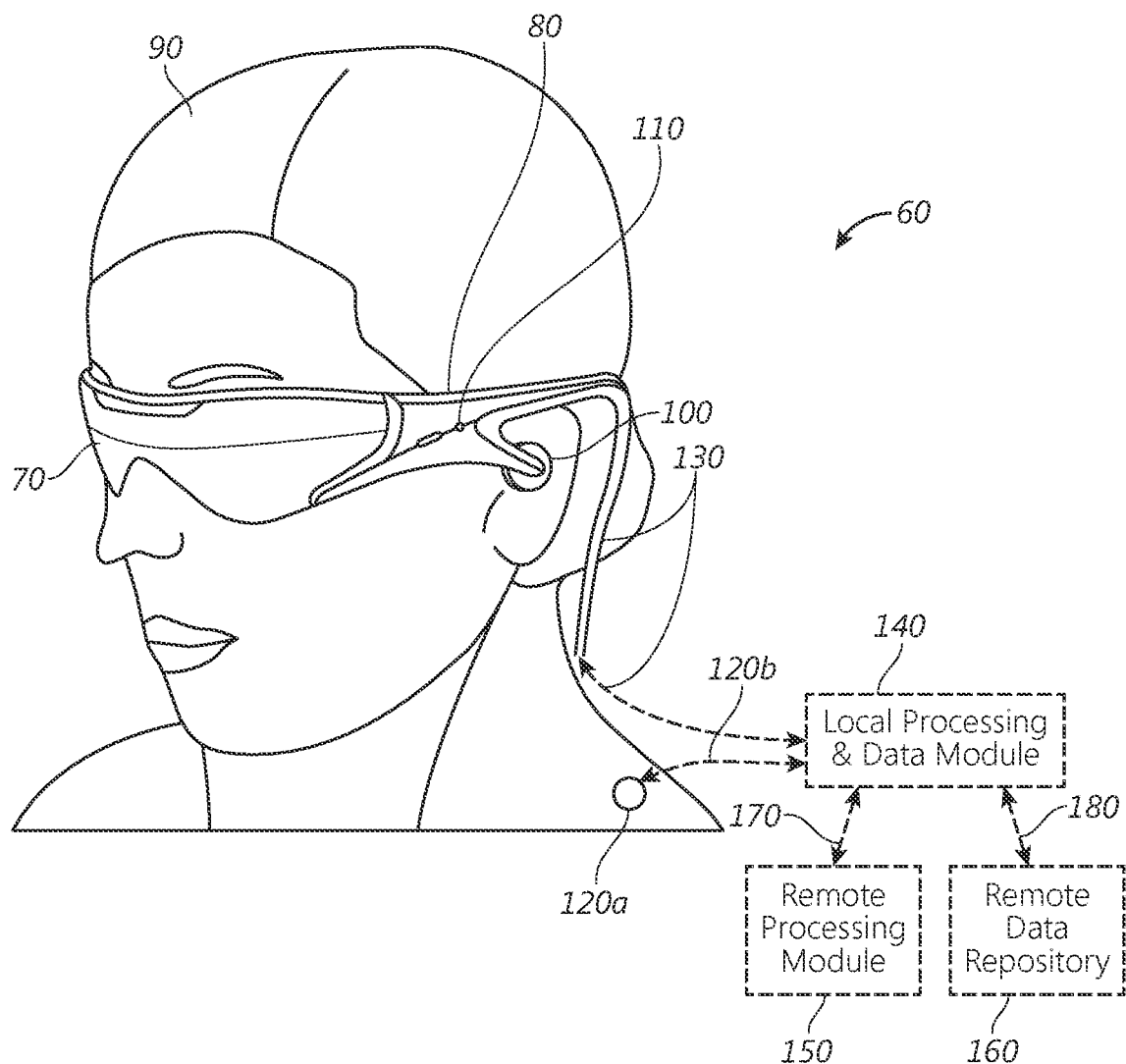
FIG. 2 illustrates an example of wearable display system.

FIG. 2 illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 2, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Figure 3:
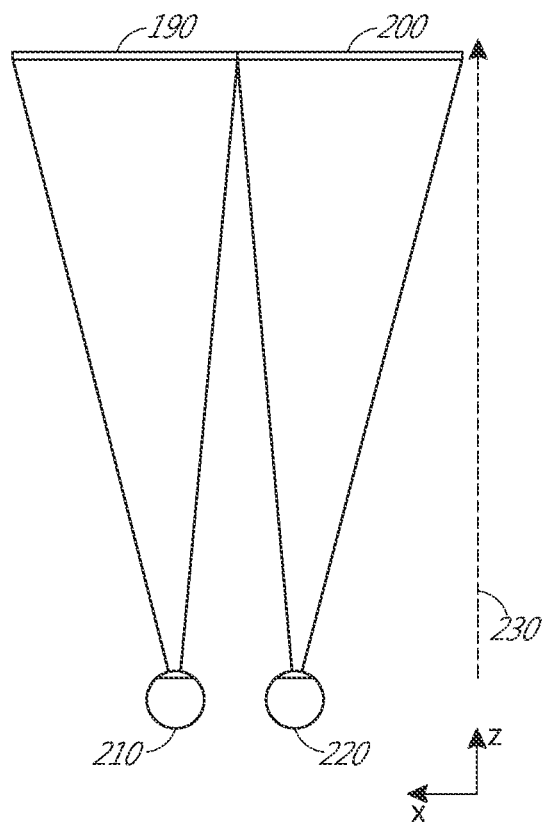
FIG. 3 illustrates a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
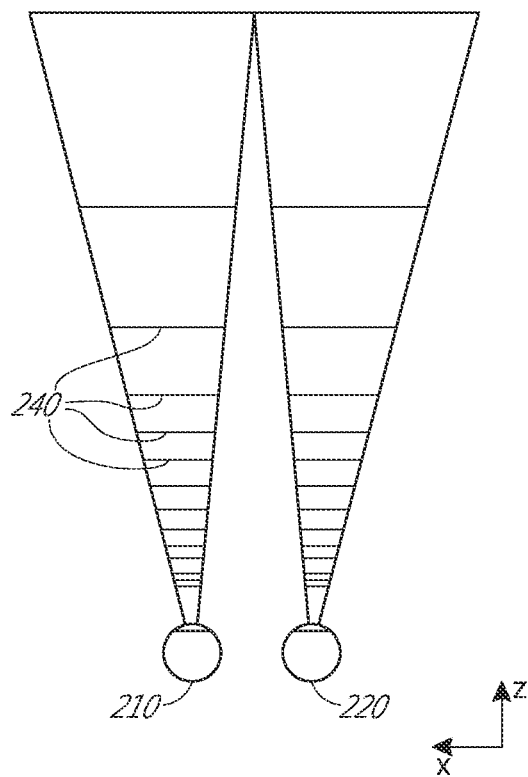
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
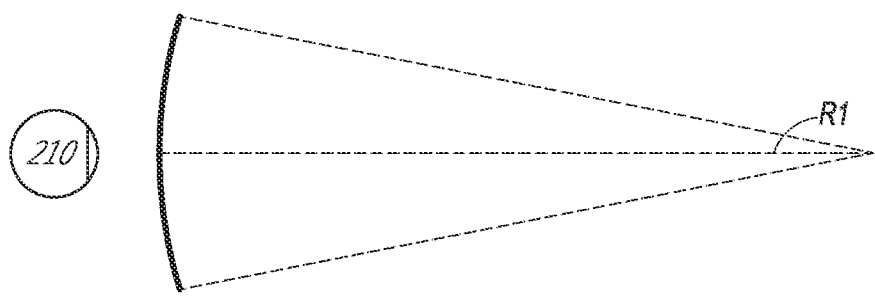
FIGS. 5A-5C illustrate relationships between radius of curvature and focal radius.
Figure 5B:
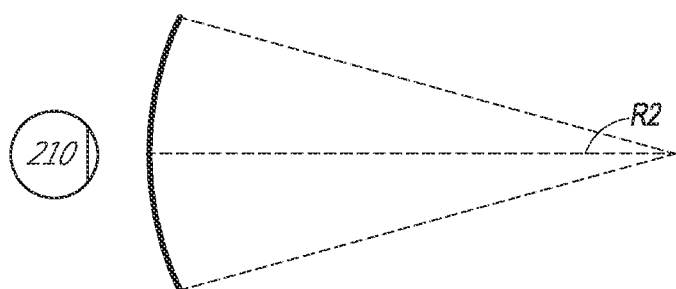
Figure 5C:
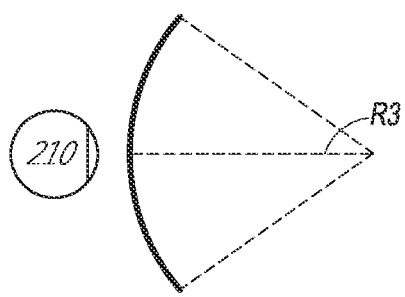

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
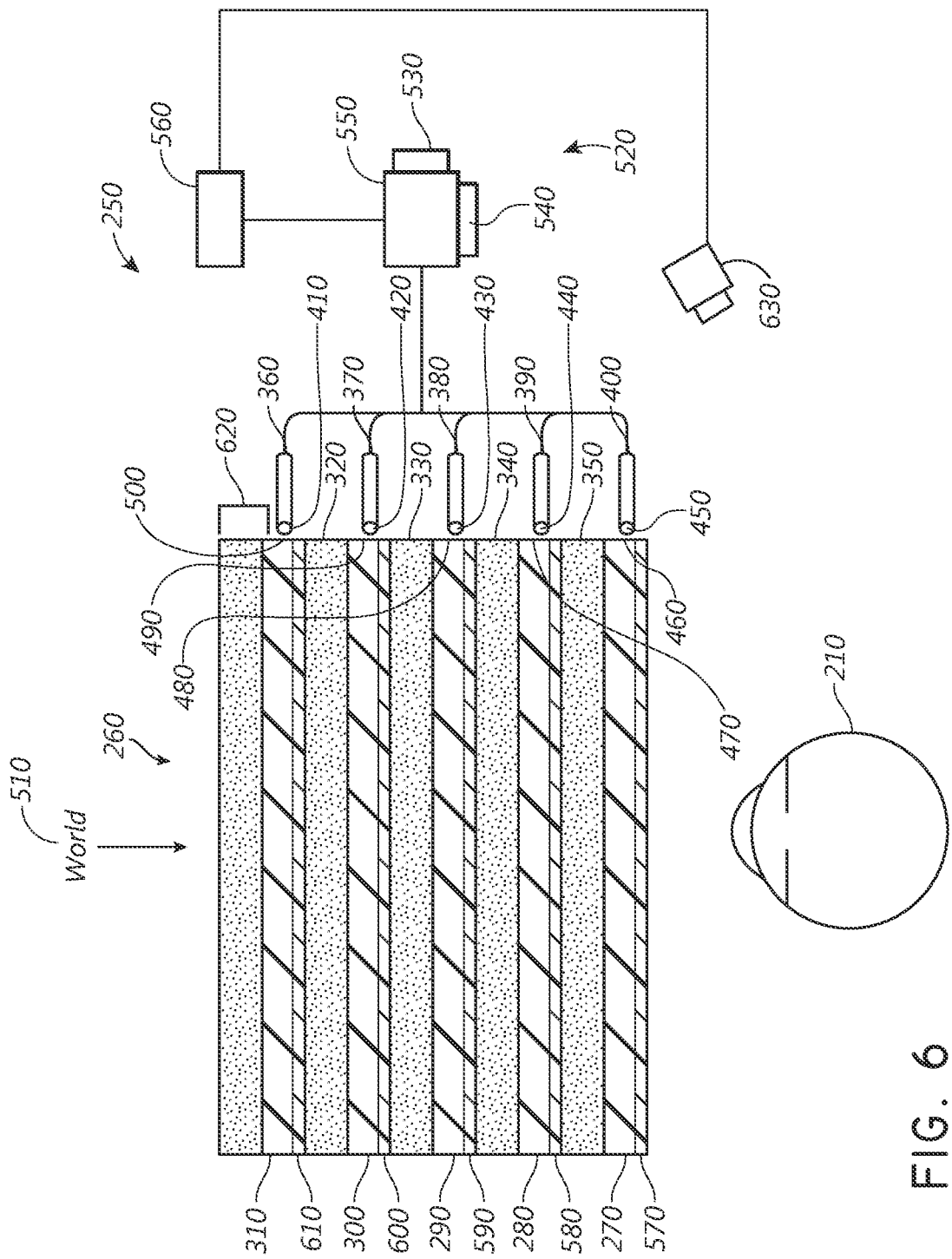
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310. Examples of spatial light modulators include liquid crystal displays (LCD) including a liquid crystal on silicon (LCOS) displays.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2) and may be in electrical communication with the processing modules 140 and/or 150, which may process image information from the camera assembly

630. In some embodiments, one camera assembly 630 may be utilized for each eye, to separately monitor each eye.

Figure 7:
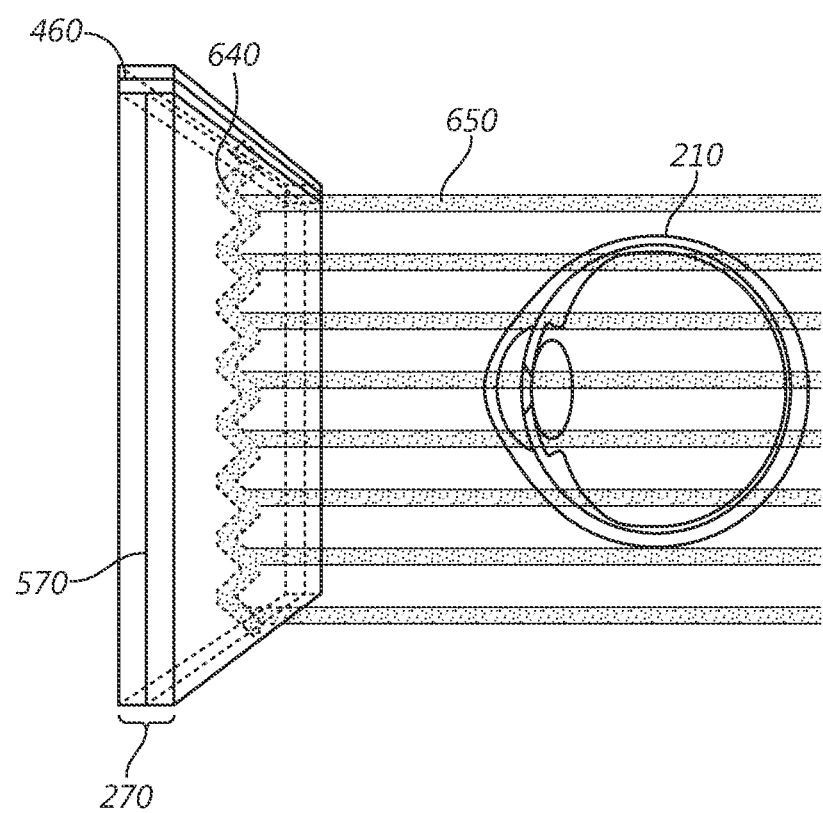
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
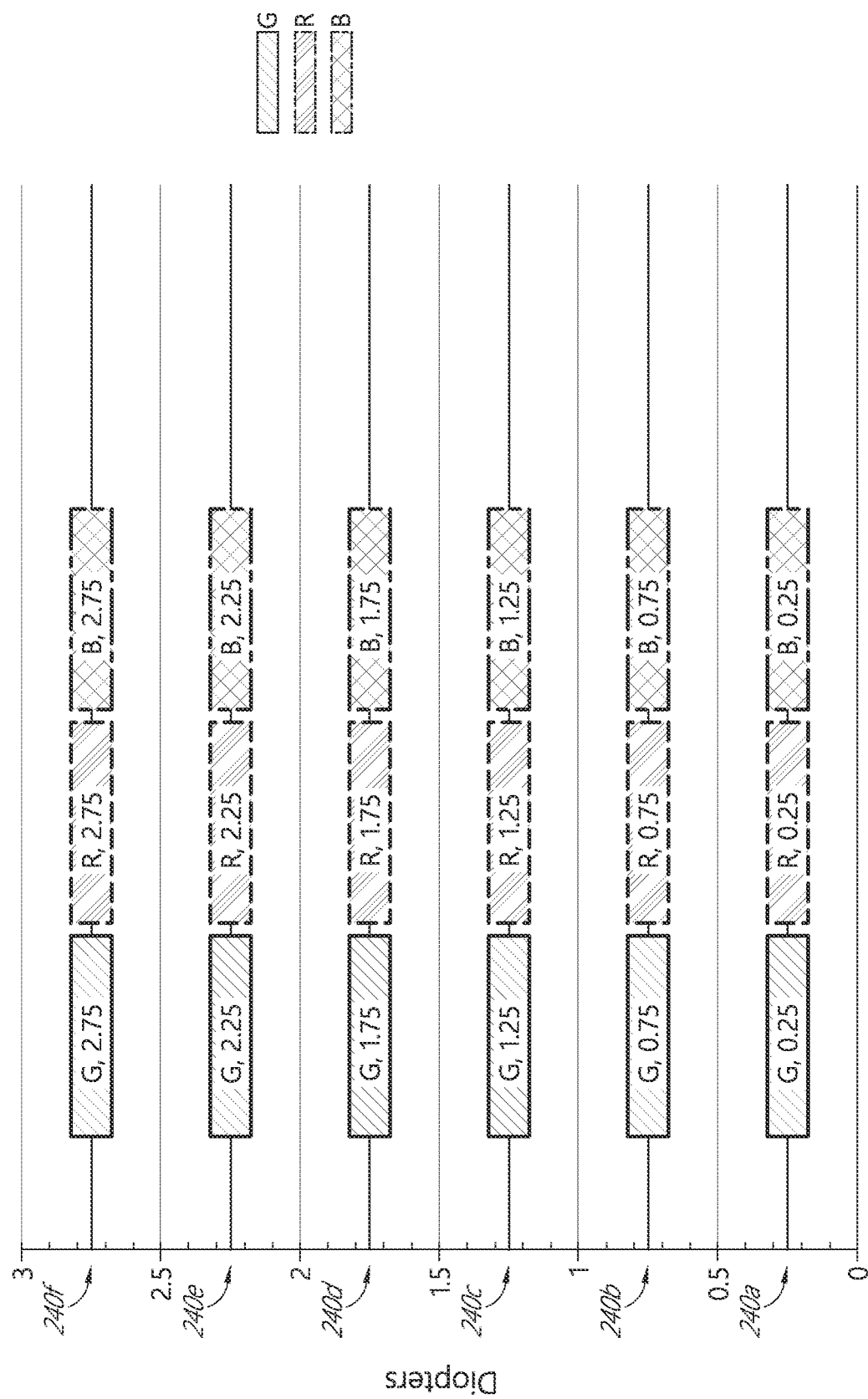
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240*a*-240*f,* although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (l/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
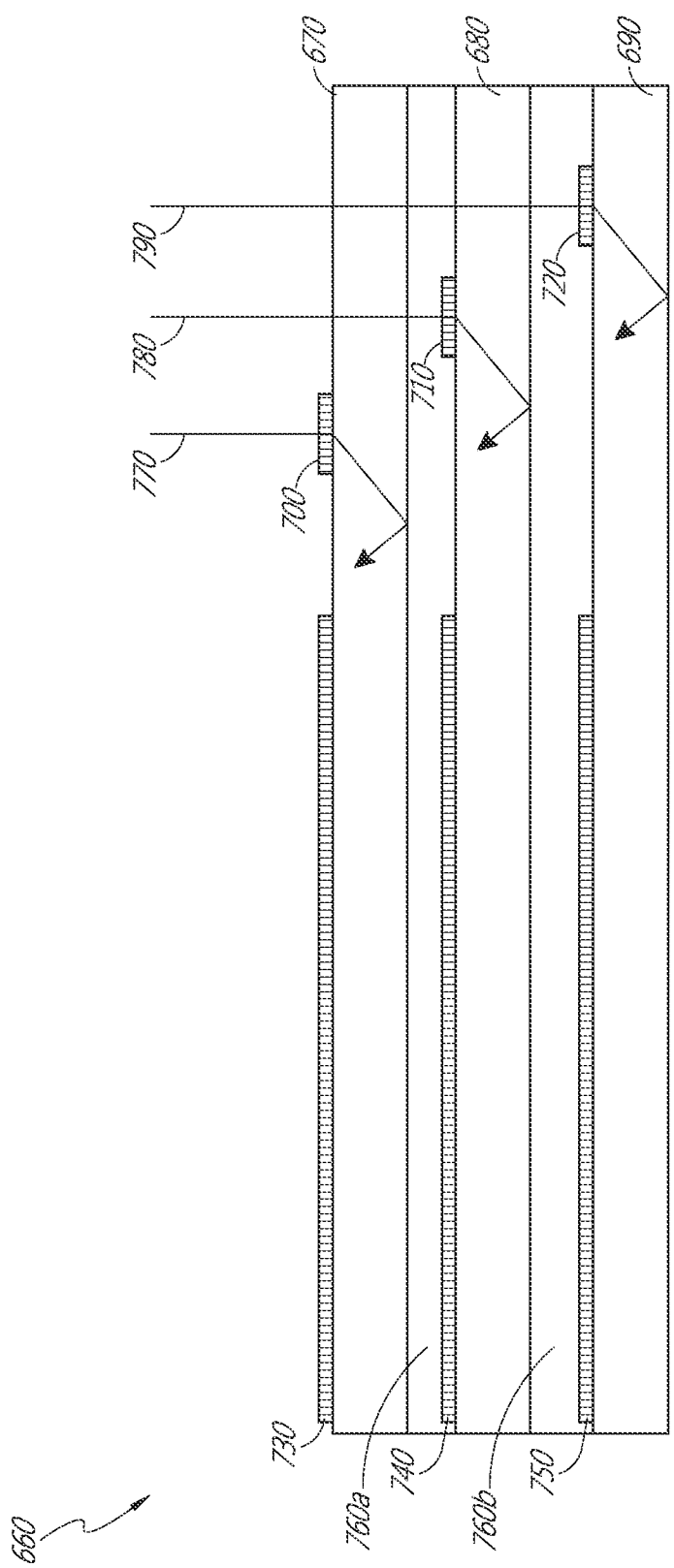
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 1242 and 1244, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
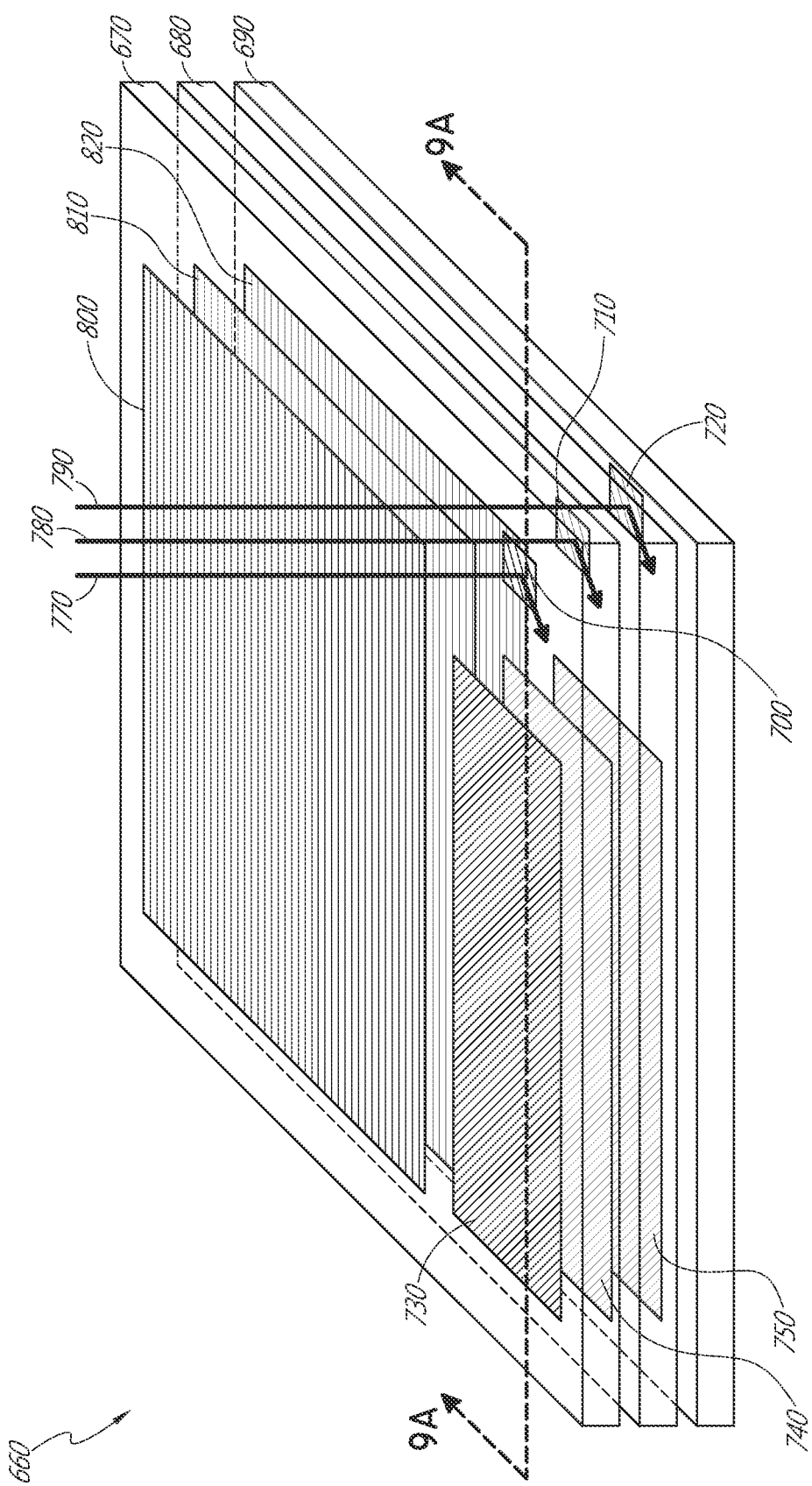
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
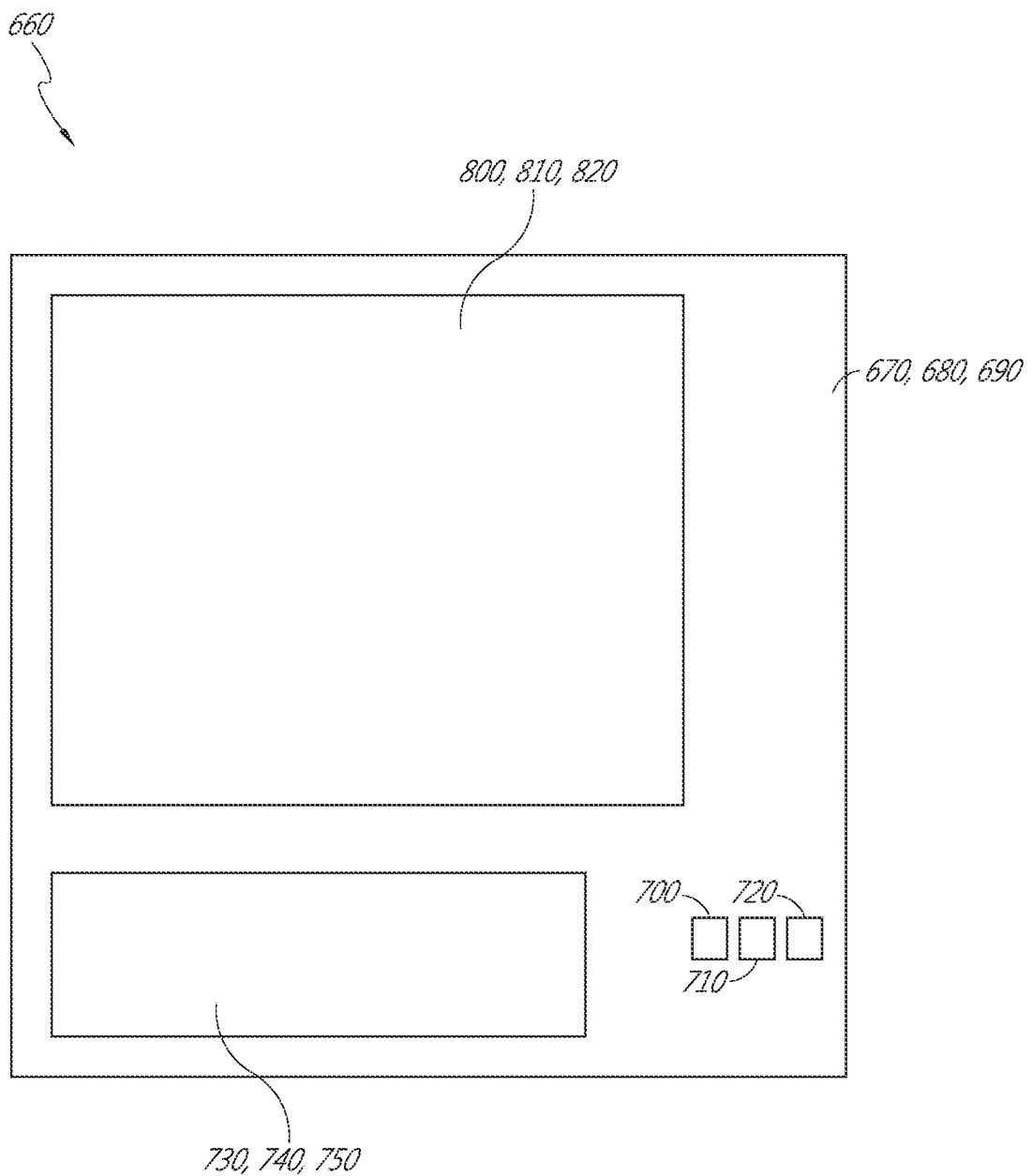
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Optical Elements Formed of Polymer-Based Optical Structures Incorporating an Inorganic Material Display systems may employ various optical elements for controlling the propagation of light. However, in some contexts, such as display systems including a head-mounted display device (e.g., the display system 80 described supra with reference to FIG. 2), conventional optical elements may not be desirable or suitable, owing to their relatively heavy weight, large size, manufacturing challenges, and/or deficiencies in optical properties such as diffraction angles and diffraction efficiency.

For example, as described above with reference to FIGS. 9A-9C, display systems may include optical elements (e.g., incoupling optical elements, light distributing elements and outcoupling optical elements), which may include diffraction gratings. Furthermore, as further described above with reference to FIGS. 9A-9C, light that is coupled into a corresponding waveguide can propagate within the waveguide by total internal reflection (TIR). To achieve TIR, it may be desirable for the diffraction grating to have relatively high diffraction angles relative to a surface normal. In addition, high diffraction efficiencies can be desirable to increase light intensity and image brightness. However, providing diffraction gratings capable of achieving high diffraction angles and high diffraction efficiencies for visible light can impose a challenge. To address these and other needs, examples of optical elements disclosed herein, e.g., diffraction gratings, may utilize optical elements formed of periodically repeating polymer-based optical structures which incorporate therein an inorganic material.

Figure 10:
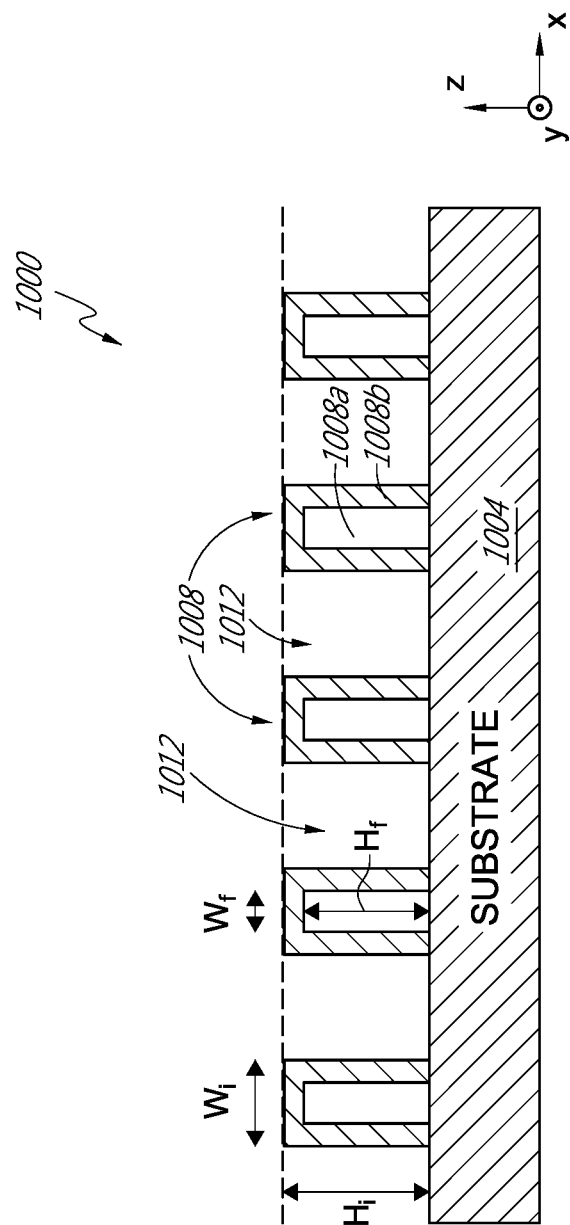
FIG. 10 schematically illustrates a cross-sectional view of an optical element comprising periodically repeating polymer-based optical structures having incorporated therein an inorganic material.

FIG. 10 illustrates a cross-sectional view of an optical element, e.g., a diffraction grating 1000, comprising periodically repeating polymer-based optical structures having incorporated therein an inorganic material, according to various implementations. The diffraction grating 1000 includes a substrate 1004 having a first refractive index ($n_1$) and transparent in the visible spectrum. The diffraction grating 1000 additionally includes a pattern of periodically repeating optical structures 1008 formed on the substrate 1004 and configured to diffract visible light. The optical structures 1008 have a second refractive index ($n_2$) greater than the first refractive index and comprise a polymeric material having incorporated therein an inorganic material.

According to embodiments, the substrate 1004 is transparent in the visible spectrum. As described herein and throughout the specification, a "transmissive" or "transparent" structure, e.g., a transmissive substrate, may allow at least some, e.g., at least 20, 30, 50, 70, 90%, or 95% of an incident light, to pass therethrough but may transmit less than 99% or 100%. The percent transmission may be within any range defined by any of these values or may be outside these ranges. Accordingly, a transparent substrate may be a glass, sapphire or a polymeric substrate in some embodiments. A "reflective" structure, e.g., a reflective substrate, may reflect at least some, e.g., at least 20, 30, 50, 70, 90%, or 95% or more of the incident light, to reflect therefrom but may reflect less than 99% or 100%. The percent reflection may be within any range defined by any of these values or may be outside these ranges.

According to embodiments, the substrate 1004 has a first refractive index ($n_1$) that is greater that of air but less than the second refractive index $n_2$ of the optical structures 1008. The $n_1$ can have a value, e.g., about 1.5, 1.6, 1.7, 1.8, 1.9, or any value in any range defined by these values or outside theses ranges. Examples of materials for forming the substrate 1004 include silica glass (e.g., doped silica glass), silicon oxynitride, transition metal oxides (e.g., hafnium oxide, tantalum oxide, zirconium oxide, niobium oxide, lithium niobate, aluminum oxide (e.g., sapphire)), plastic, polymer, or other optically transmissive material having, e.g., a suitable refractive index as described herein.

The pattern of periodically repeating optical structures 1008 formed on the substrate 1004 is configured to diffract visible light, due to the material, dimensions and geometric configuration, such as described herein.

Still referring to FIG. 10, according to various embodiments, the optical structures 1008 comprise a base polymeric material having incorporated therein an inorganic material. The base polymeric material may comprise a suitable polymer for incorporation of the inorganic material and for serving as a material that can be patterned lithographically such as a photosensitive material that can be patterned photolithographically such as photoresist or another material that can be easily patterned. For example, the base polymeric material can include, among other polymers, polyethylene (PE) ($-(CH_2-CH_2)_n-$), polypropylene (PP) ($-[CH_2-CH(CH_3)]_n-$), poly(vinyl chloride) (PVC) ($-[CH_2-CH(CH_3)]_n-$), poly(vinylidene chloride) ($-(CH_2-CCl_2)_n-$), polystyrene (PS) ($-[CH_2-CH(C_6H_5)]_n-$), polyacrylonitrile (PAN) ($-(CH_2-CHCN)_n-$), polytetrafluoroethylene (PTFE,) ($-(CF_2-CF_2)_n-$), poly(methyl methacrylate) (PMMA) ($-[CH_2-C(CH_3)CO_2CH_3]_n-$), poly(vinyl acetate) (PVAc) ($-(CH_2-CHOCOCH_3)_n-$), cis-polyisoprene ($-[CH_2-CH=C(CH_3)-CH_2]_n-$), and polychloroprene (cis+trans) ($-[CH_2-CH=CCl-CH_2]_n-$), to name a few. In some embodiments, chains of the base polymer may be configured as a homopolymer. In some other embodiments, chains of the base polymer may be configured as a copolymer. When configured as a copolymer, chains of the base polymer may be configured to have one of various forms, including but not limited to, e.g., a statistical copolymer, an alternating copolymer, a block copolymer and a graft copolymer incorporating monomer units of the various polymers described above.

The specific polymer may be selected based on, among other factors, the deposition chemistry for forming the inorganic material to be incorporated into the base polymeric material. For example, in various embodiments, polymer chains of the base polymer units may include various functional groups, e.g., carbonyl groups, hydroxyl groups and pyridine groups, which are adapted to react with a metal precursor that may be used to form the inorganic material, as will be described in further detail infra. To provide one example, when the deposition chemistry includes $Al(CH_3)_3$ (TMA) as a metal precursor and $H_2O$ as an oxidizing precursor for formation of $Al_2O_3$, then PMMA may be included in the polymeric material, such that the carbonyl group of PMMA may react with TMA to form Al—OH species, which in turn reacts with $H_2O$ in a hydrolysis reaction to form $Al_2O_3$. Additional examples are described more in detail infra.

In various embodiments, the base polymer can be photosensitive or photoreactive. The base polymer can include a photoresist or serve as a photoresist. In some embodiments, the photoresist can be a positive resist in which portions that are exposed to light becomes soluble to photoresist developers, while unexposed portions remain insoluble to photoresist developers. In some other embodiments, the photoresist can be a negative photoresist in which portions of the photoresist that are exposed to light becomes insoluble to photoresist developers, while unexposed portions are dissolved by photoresist developers.

When included, in some embodiments, the photoresist in the base polymer may be photopolymeric photoresist, which can include, e.g., allyl monomer, that is configured to generate free radical when exposed to light, which in turn initiates the photopolymerization of monomer to produce the polymer. When configured as a negative resist, photopolymeric photoresist can include, e.g. methyl methacrylate. When included, in some other embodiments, the photoresist in the base polymer can be a photodecomposing photoresist that is configured to generate hydrophilic products under light. When configured as a positive resist, photodecomposing photoresists can include, e.g., azide quinone, e.g. diazonaphthoquinone (DQ). When included, in some other embodiments, the photoresist in the base polymer can be a photocrosslinking photoresist, which is configured to crosslink chain by chain when exposed to light, to generate an insoluble network.

Still referring to FIG. 10, according to various embodiments, the inorganic material incorporated into the optical structures 1008 may include an insulating material, e.g., a metal oxide or a metal nitride. In some embodiments, the inorganic material includes an oxide, a nitride or an oxynitride of one or more transition metals, including but not limited to Al, Zn, Zr, Hf, Ti and Ta. For example, the inorganic material may include aluminum oxide, zinc oxide, zirconium oxide, hafnium oxide, titanium oxide, tantalum oxide and combinations thereof, to name a few As describe herein, when the inorganic material includes an oxide, it can be stoichiometric or substoichiometric. For example, aluminum oxide can be in a stoichiometric form of $Al_2O_3$, as well as in a substoichiometric form of $AlO_x$, where x is less than the stoichiometric value of 1.5. In addition, as described herein, an oxide of a metal can include other metals. For example, aluminum oxide can be included as part of aluminum hafnate ($AlHfO_x$). Thus the material may include two different metals.

According to embodiments, the inorganic material may be selected based on its bulk refractive index. The refractive index of the inorganic material may be higher than the refractive index of the substrate. The refractive index of the inorganic material may, for example, be greater than 1.7, 2.0, 2.3, 2.6, 3.0, or have a value in a range defined by these values or may be outside these ranges. In some embodiments, the inorganic material may be a stoichiometric material selected based on its bulk refractive index. For example, the inorganic material may be a stoichiometric aluminum oxide having a refractive index of 1.66, a stoichiometric zinc oxide having a refractive index of 1.95, a stoichiometric zirconium oxide having a refractive index of 1.95, a stoichiometric hafnium oxide having a refractive index of 2.09, a stoichiometric titanium oxide having a refractive index of 2.35, or a combination thereof, to name a few. In some other embodiments, the inorganic material may be a substoichiometric inorganic material having a refractive index greater than the refractive index of the corresponding stoichiometric inorganic material. For example, the refractive index of a metal oxide may be increased by 2%, 5%, 10%, 20% or 30%, or by any percentage in any ranges defined by these values, by reducing the oxygen content. In some other embodiments, the inorganic material may be a mixture of inorganic materials having a refractive index between refractive indices of the component inorganic materials. For example, the refractive index of a ternary metal oxide may be tuned to be between the refractive indices of component binary metal oxides by tuning the relative fractions.

In some embodiments, the optical structures 1008 have a refractive index that is between the base polymeric material and the inorganic material incorporated therein. In various embodiments, the second refractive index of the optical structures comprising the optical material is greater than 1.7, 1.8, 1.9, 2.0 or 2.1 and is greater than the first refractive index of the substrate by at least 0.2, 0.4, 0.6, 0.8 or 1.0. However, embodiments are not so limited and the second refractive index can be the same or lower than the first refractive index.

As the base polymeric material of the optical structures 1008 can incorporate therein an inorganic material in various configurations. In the illustrated embodiment, the optical structures 1008 comprise a base polymer region 1008a and an infiltrated region 1008b infiltrated with the inorganic material described above. In the illustrated embodiment, the inorganic material is incorporated into surface regions of the optical structures 1008 such that each optical structure 1008 has the base polymer region 1008a comprising a core region that substantially does not have the inorganic material incorporated therein, and has the infiltrated region 1008b comprising a surface region that has the inorganic material infiltrated therein.

According to embodiments, the infiltrated region 1008b has a width, depth or thickness greater than about 1 nm, 10 nm, 20 nm, 50 nm, 100 nm, 200 nm, 300 nm, or a thickness within a range defined by these values or possibly outside these ranges.

In some embodiments, the base polymer region 1008a is substantially free of the inorganic material. In some cases, the base polymer region 1008a has less than 40%, 30%, 20%, 10%, 5%, 1%, 0.5%, or 0.1%, (or any range defined by these values,) of the inorganic material on the basis of the total volume of the base polymer region 1008a. In contrast, the infiltrated region 1008b is substantially infiltrated with the inorganic material. In some cases, the infiltrated region 1008b has more than 40%, 50%, 60%, 70%, 80% or 90%, (or any range defined by these values), of the inorganic material on the basis of the total volume of the infiltrated region 1008b.

The diffraction grating 1000 has the optical structures 1008 arranged such that adjacent ones of the periodically repeating optical structures 1008 are separated by a space 1012. In the illustrated embodiment, the surface of the substrate in the space 1012 does not have the base polymeric material or the inorganic material formed thereon. This is because prior to incorporating the inorganic material, the base polymer material may be completely removed between adjacent ones of base polymer structures, such that the surface of the substrate is exposed in the resulting space 1012 between the adjacent ones of the periodically repeating base polymer structures. Subsequently, because the exposed surface of the substrate does not have formed thereon the functional groups adapted for adsorbing or chemisorbing the metal precursors for forming the inorganic material, the inorganic material does not form thereon or incorporate into the substrate 1004. As a result, the surface of the substrate in the space 1012 does not have the base polymeric material or the inorganic material formed thereon. This process is described more in detail infra with respect to FIGS. 14A-14B.

Figure 16A:
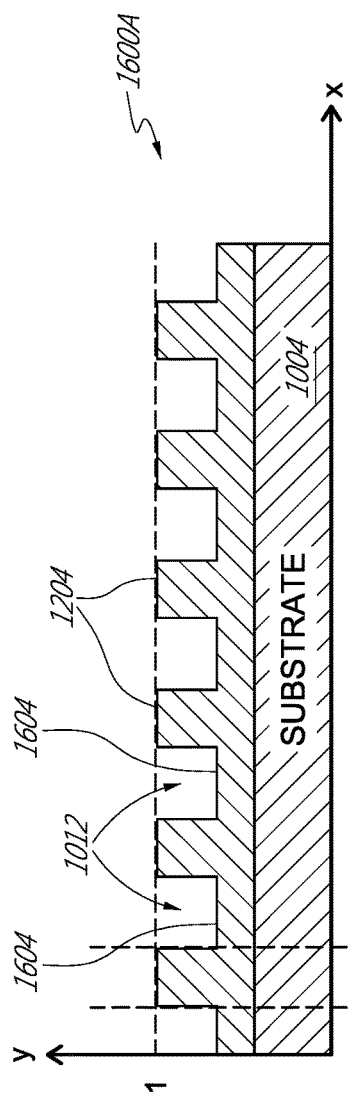
FIGS. 16A-16B are cross-sectional views of intermediate structures at various stages of fabrication of an optical element comprising periodically repeating polymer-based optical structures having incorporated therein an inorganic material.

However, as illustrated in detail infra, other embodiments are possible. In other embodiments, adjacent one of the periodically repeating optical structures 1008 are separated by a space 1012, where the surface of the substrate in the space has formed thereon a layer of polymeric material (FIGS. 15B, 16B) having incorporated therein the inorganic material, as described in detail with respect to FIGS. 15A-15B and 16A-16B. In these embodiments, prior to incorporating the inorganic material, the base polymer material is incompletely or partially removed between adjacent ones of periodically repeating base polymer structures, such that the surface of the substrate remains covered with a thin layer of base polymer in the spaces 1012 between the adjacent ones of protruding base polymer structures (FIGS. 15A, 16A). Subsequently, surfaces of protruding base polymer structures, as well as surfaces of the polymer layers between adjacent ones of the protruding base polymer structures, are exposed to precursors to incorporate the inorganic material. For example, the incorporation of inorganic material may result from the presence of functional groups in the base polymer structures that adsorb or chemisorb the metal precursors, and from the subsequent reaction between the metal precursors and the oxidizing precursors to form the inorganic material in the optical structures 1008. In some embodiments, the layer of polymeric material formed in the space can have an entire thickness or a partial thickness incorporated with the inorganic material. These processes are described in detail infra with respect to FIGS. 15A-15B and 16A-16B.

Figure 11:
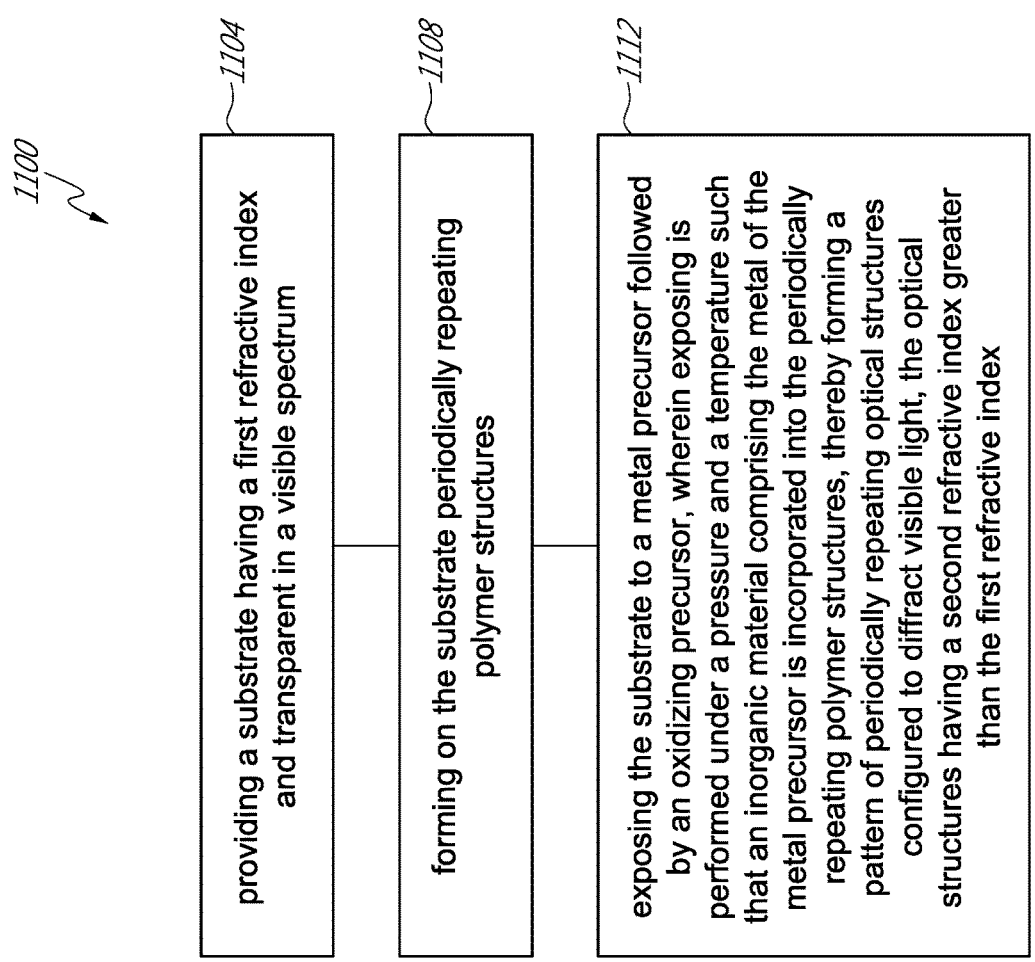
FIG. 11 schematically illustrates a method of fabricating an optical element comprising periodically repeating polymer-based optical structures having incorporated therein an inorganic material.

Method of Fabricating Optical Elements Formed of Polymer-Based Optical Structures Incorporating Therein an Inorganic Material In the following, methods of fabricating polymer-based optical elements comprising polymer-based optical structures incorporating therein an inorganic material, e.g., a diffraction grating 1000 (FIG. 10), are described. Referring to FIG. 11, a method 1100 includes providing 1104 a substrate having a first refractive index and transparent in the visible spectrum. The method additionally includes forming 1108 on the substrate periodically repeating base polymer structures. The method further includes 1112 exposing the substrate to a metal precursor followed by an oxidizing precursor. Exposing the substrate is performed under a pressure and temperature such that an inorganic material comprising the metal is incorporated into the periodically repeating base polymer structures, thereby forming a pattern of periodically repeating optical structures configured to diffract visible light, where the optical structures have a second refractive index greater than the first refractive index.

Referring to FIG. 11, a substrate is provided 1104 having a first refractive index and transparent in the visible spectrum. This may include, for example, providing the substrate 1004 as described supra with respect to FIG. 10.

Still referring to FIG. 11, periodically repeating base polymer structures are formed 1108 on the substrate. Forming the polymer structures can be achieved using a suitable process including, e.g., a lithographic process (FIGS. 12A-12C) or a nanoimprinting process (FIGS. 13A-13C), as described below. In some embodiments, as described with respect to FIGS. 12A-12C forming 1108 on the substrate periodically repeating optical structures may be performed by depositing a suitable polymeric material as described above with respect to FIG. 10, followed by patterning using lithography and etch processes. In some other embodiments, as described with respect to FIGS. 13A-13C, forming 1108 on the substrate periodically repeating optical structures may be performed by depositing a suitable polymeric material as described above with respect to FIG. 10, followed by patterning using a nanoimprint technique.

FIGS. 12A-12C illustrate cross-sectional views of intermediate structures 1200A-1200C, respectively, at various stages of fabricating periodically repeating base polymer structures using a lithographic process, according to embodiments. Referring to the intermediate structure 1200A of FIG. 12A, the method includes providing a substrate 1004. The substrate 1004 includes an optically transmissive material having a first refractive index ($n_1$) and possibly various other material attributes such described above with reference to FIG. 10. The method additionally includes forming on the substrate 1004 a base polymer layer 1208 having an index of refraction $n_{2\ initial}$ and possibly various other material attributes such as described above with reference to FIG. 10. The base polymer layer 1208 is suitable, when patterned, for forming periodically repeating base polymer structures such as described above with reference to FIG. 10.

In some embodiments, the base polymer layer 1208 is formed of a single layer that serves to provide functional groups for subsequent adsorption, chemisorption or reaction of metal precursors. The base polymer layer 1208 also serves as a photoresist capable of being photolithographically patterned by exposure/development and subsequent etching. The base polymer layer 1208 can be a single layer serving both of these functionalities. However, designs need not be so limited, and in some other embodiments, the base polymer layer 1208 may include a plurality of layers, including a photoresist layer formed on a separate active polymer layer having the functional groups for adsorption, chemisorption or reaction of metal precursors. That is, the base polymer layer 1208 may comprise a multilayer structure, for example, when a single base polymer layer 1208 does not sufficiently serve as a photoresist and for providing the functional groups for adsorbing, chemisorbing or reacting the metal precursors.

Depending on the design, the base polymer layer 1208 may be deposited by spin-coating, followed by a post-bake.

Referring to the intermediate structure 1200B of FIG. 12B, after deposition and post-deposition bake, the method includes patterning the base polymer layer 1208 by selectively exposing portions thereof to a pattern of light produced by a photomask 1216. As illustrated, the photomask 1216 can be positive photomask adapted for a positive photoresist, and can be configured to pass light in regions where the base polymer layer 1208 is to remain. When the photomask 1216 is a negative photomask adapted for negative photoresist, the photomask could be oppositely configured to pass light in regions where the base polymer layer 1208 is to be removed from.

The exposure to light 1212, e.g., coherent UV light, or an electron beam, causes a chemical change, e.g., polymeric crosslinking in base polymer layer 1208, e.g., including the photoresist, which allows exposed portions of the base polymer layer 1208 to be selectively removed using a developer solution for a base polymer layer 1208 including or serving as a positive photoresist, or allows unexposed portions of the photoresist to be selectively removed using a developer solution for base polymer layer 1208 including or serving as a negative photoresist.

Referring to the intermediate structure 1200C of FIG. 12C, upon selectively removing, the resulting periodically repeating base polymer structures 1220a/1220b remain on the substrate 1004, thereby serving as a template for subsequent infiltration of the inorganic material. The base polymer structures 1220a may be a set of base polymer structures elongated in a first direction, e.g., the y-direction. Alternatively, the base polymer structures 1220b may be a set of base polymer structures elongated in a second direction, e.g., the x-direction. The base polymer structure can also include base polymer structures elongated in the first direction and base polymer structures elongated in the second directions. Other configurations are possible.

Figure 13A:
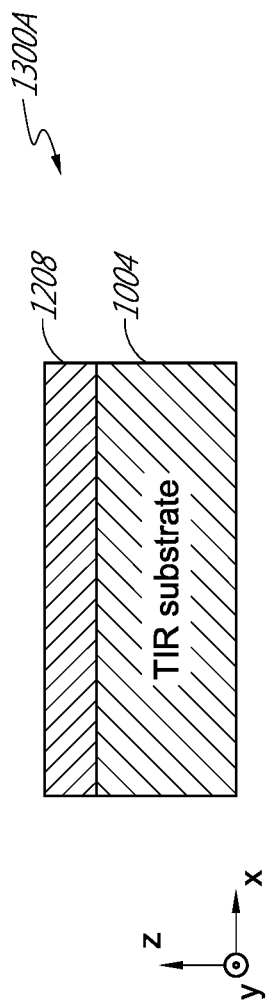
FIGS. 13A-13C are cross-sectional views of intermediate structures at various stages of fabrication using a nanoimprinting process, periodically repeating base polymer structures.
Figure 13B:
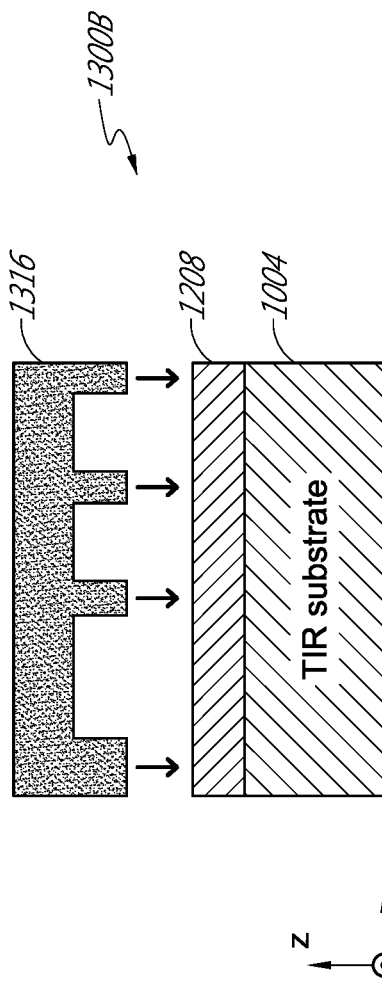
Figure 13C:
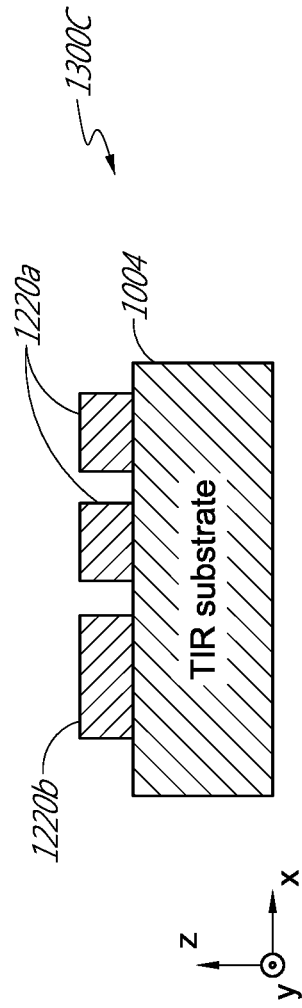

FIGS. 13A-13C illustrate cross-sectional views of intermediate structures 1300A-1300C, respectively, at various stages of fabrication of periodically repeating base polymer structures using a nanoimprint process. In the illustrated example, the method of forming the intermediate structure 1300A is similar to the method of forming the intermediate structure 1200A of FIG. 12A. However, the method of forming the intermediate structures 1300B and 1300C of FIGS. 13B and 13C, respectively, is different from the method forming the intermediate structure 1200B and 1200C of FIGS. 12B and 12C, respectively, whose differences are described below.

Referring to the intermediate structure 1300B of FIG. 13B, unlike the method described above with reference to FIG. 12B, instead of patterning the base polymer layer 1208 by selectively exposing and removing portions thereof using light or an electron beam and a developer solution, in the illustrated example, a nanoimprint template 1316, or a nanoimprint mold, which has predefined topological patterns in accordance with formation of the periodically repeating base polymer structures, is brought into contact with the base polymer layer 1204. Subsequently, the template 1316 is pressed into the base polymer layer 1208, which can include a thermoplastic polymer under certain temperature, e.g., above the glass transition temperature of the base polymer layer 1208, thereby transferring the pattern of the template 1316 into the softened base polymer layer 1208. After being cooled down, the template 1316 is separated from the base polymer layer 1208, and the patterned periodically repeating base polymer structures 1220a/1220b are left on the substrate 1004. In some other approaches, after being pressed into the base polymer layer 1208, the base polymer layer 1208 is hardened by crosslinking under UV light.

Referring back to FIG. 11, the method of fabricating polymeric optical elements incorporating an inorganic material further includes exposing 1112 the substrate to a metal precursor followed by an oxidizing precursor, where exposing the substrate is performed under a pressure and temperature such that an inorganic material comprising the metal is incorporated into the periodically repeating base polymer structures, thereby forming a pattern of periodically repeating optical structures configured to diffract visible light, where the optical structures have a second refractive index greater than the first refractive index. In the following, in reference to FIGS. 14A-14B, 15A-15B and 16A-16C, different ways of exposing the substrate to incorporate the inorganic material into the periodically repeating base polymer structures are described.

FIG. 14A illustrates an intermediate structure 1400A comprising periodically repeating base polymer structures 1204 fabricated using, e.g., methods similar to the methods illustrated above with respect to FIGS. 12A-12C and FIGS. 13A-13C. The periodically repeating base polymer structures 1204 formed on the substrate 1004 are thus similar to the periodically repeating base polymer structures 1220a/1220b illustrated above with respect to FIGS. 12A-12C and FIGS. 13A-13C. FIG. 14B illustrates an intermediate structure 1400B comprising periodically repeating optical structures 1008 having incorporated therein an inorganic material, as described above with respect to FIG. 10. In the following, in reference to FIGS. 14A and 14B, a method of incorporating an inorganic material into the periodically repeating base polymer structures 1204 (FIG. 14A) to form the periodically repeating optical structures 1008 (FIG. 14B) is described in detail.

Incorporating the inorganic material into the periodically repeating base polymer structures 1204 (FIG. 12A) to form the periodically repeating optical structures 1008 (FIG. 12B) can be performed using some process features that are used in atomic layer deposition (ALD). In some aspects, ALD can be considered to include types of chemical vapor deposition (CVD) process with self-limiting growth that is controlled by the distribution of a chemical reaction into two separate half reactions that are included in a growth cycle. A growth cycle such for an ALD process can include four stages: (1) exposure of the first precursor, e.g., a metal precursor; (2) purge of the reaction chamber; (3) exposure of the second precursor, e.g., an oxidizing precursor; and (4) a further purge of the reaction chamber. In the first stage of the ALD process, the first precursor reacts with sites on the substrate to form a full or partial molecular layer of the first precursor. In the second stage, unreacted first precursor molecules may be purged and/or pumped out using, e.g., inert gas such as argon or $N_2$, to reduce, prevent or minimize gas phase reactions that might occur between remaining first precursor and subsequently introduced second precursor, whose reaction prevents growth at a molecular layer by layer level. In the third stage, the second precursor is introduced into the purged chamber to react with the molecular layer of the first precursor, thereby resulting in a single molecular layer or a sub molecular layer of the target material. The fourth stage includes purging/pumping the residuals of the second precursor, in preparation for another growth cycle, which can be repeated until a desired thickness is achieved.

As described above with respect to FIG. 10, the inorganic material incorporated into the optical structures 1008 may include a metal compound such as dielectric that includes metal. The inorganic material may include, for example, a metal oxide or a metal nitride, e.g., an oxide, a nitride or an oxynitride of one or more transition metals, including Al, Zn, Zr, Hf, Ti and Ta. An ALD growth cycle can thus include: (1) exposure of the substrate to a metal precursor comprising the transition metal; (2) purge of the reaction chamber; (3) exposure of an oxidizing precursor; and (4) a further purge of the reaction chamber. The inorganic material can be produced by an oxidization process to yield, for example, metal oxide, metal nitride or other inorganic materials.

Advantageously, using an ALD process for incorporating the inorganic material provides a number of advantages. For example, because adsorption, chemisorption or reaction of precursors provides control of the amount of deposited material at monolayer or submonolayer level, the film thickness or the amount of deposited material can be controlled precisely based on the number of reaction cycles. In addition, because precursors in the gas phase can reach surfaces that are difficult or impossible to access using other deposition techniques, e.g., deposition techniques such as physical vapor deposition (PVD) or plasma-enhanced chemical vapor deposition (PECVD) that can be line-of-sight and/or aspect-ratio dependent, ALD can be a suitable method for the deposition of conformal thin films on three dimensional surfaces. Furthermore, because adsorption, chemisorption or reaction can occur at relatively low temperatures (e.g., less than 100° C.), ALD can be suitable for deposition on structures or surfaces having limited thermal budget or thermal tolerance.

Thus, in preferred embodiments, incorporating the inorganic material into the periodically repeating base polymer structures 1204 to form the periodically repeating optical structures 1008 can be performed in a reactor configured for ALD and/or using some process features that are used in ALD as described above.

Certain combinations of pressure, temperature and time can be particularly suitable for forming the optical structures 1008, as described in detail as follows. Thus, according to embodiments, exposing the substrate to one or both of the metal precursor and the oxidizing precursor comprises exposing at a total and/or a partial pressure and for a duration that are sufficient to saturate exposed surfaces of the base polymer structures with the one of both of the metal precursor and the oxidizing precursor.

Referring back to FIG. 11, according to embodiments, exposing 1112 is performed under a pressure greater than an atmospheric pressure. Without being bound to any theory, higher pressures can enhance the diffusion of precursors prior to reacting to form the inorganic material and/or enhance the diffusion of the inorganic material after formation. One or both of the total pressure and the partial pressure, during exposing with the metal and/or the oxidizing precursors, can be adjusted or optimized. In different cases, the total pressure during the exposure(s) can be between about 10 mTorr and about 100 Torr, between about 50 mTorr and about 50 Torr, between about 100 mTorr and about 10 Torr, or any pressure within a range defined by these values or outside these ranges, for instance between about 800 mTorr and about 5 Torr or 1 Torr and 5 Torr. Under a total pressure, a partial pressure of a precursor can be 2%, 5%, 10%, 20%, 50% of the total pressure, or any pressure within a range defined by these values or may be outside these ranges, for instance about 25-50 mTorr. The remaining partial pressures can be provided by gas(es) other than the precursor, e.g., an inert gas, e.g., argon and/or $N_2$.

During purge processes, the total pressure can be maintained to be the same or different than the total pressure during exposure to precursors as described above.

Depending on the approach, exposing 1112 may include exposing the periodically repeating base polymer structures 1204 to one or both of the metal precursor and the oxidizing precursor for a duration exceeding 1 sec, 5 sec., 10 sec., 30 sec., 60 sec, 100 sec., 500 sec., or 1000 sec., for instance about 10 sec. to 400 sec., or a duration within any range defined by these values. Durations outside these ranges are also possible. Depending on the situation, the exposure times may be greater than some conventional exposure times employed in conventional ALD that are sufficient to saturate a deposition surface with a precursor. Such exposure times can be less than 1 sec. Without being bound to any theory, the longer exposure times can advantageously provide sufficient time for the diffusion of precursors into the base polymer structures 1204 prior to forming the inorganic material and/or provide sufficient time for diffusion of the inorganic material after formation of one or more monolayers of the inorganic material. In some cases, a fraction of the exposure time may be sufficient to saturate the surface with a precursor, while a remainder of the exposure time can be spent to diffuse the precursors and/or the inorganic material. In some cases, the duration of exposure exceeds a duration sufficient to saturate the surface with a precursor by 10×, 20×, 50×, 100× or 1000× or any range defined by these values. Values outside these ranges are also possible.

During purge processes, the purge times can be the same or longer than the exposure times for exposure to precursors described above, e.g., by 2×, 5× or 10× or any time in a range defined by these values. The purge times can also be outside these ranges. Accordingly, the durations of the subcycles $t_1$, $t_2$, $t_3$ and $t_4$, corresponding to a first exposure time for exposing the substrate to the metal precursor, a first purge time to purge the metal precursor, a second exposure time for exposing the substrate to the oxidizing precursor and a second purge time to purge the oxidizing precursor, can have a combination of the above duration, e.g., $t_1$, $t_3$=1-100 sec or any range described above and $t_2$, $t_4$=5-500 sec or any range described above.

Depending on the configuration and/or fabrication method, exposing 1112 includes exposing the periodically repeating base polymer structures to one or both of the metal precursor and the oxidizing precursor at a temperature lower than about 100 degrees Celsius. The relatively lower temperatures can be employed to achieve a desired diffusion depth of the precursors and/or the inorganic material because the increased pressure and longer exposure time can compensate for the lower temperatures. According to embodiments, exposing can be performed at a temperature lower than 200° C., 150° C., 100° C., 80° C., 60° C., 40° C. or 20° C., or a temperature within any range defined by these values. Temperatures outside these ranges, including temperatures greater than 100° C. can be used.

Exposing the substrate to the metal precursor can comprise exposing to a precursor comprising a transition metal such as a transition metal selected from the group consisting of aluminum, zinc, zirconium, hafnium and titanium. For example, for incorporating a transition metal oxide including aluminum oxide, zinc oxide, zirconium oxide, hafnium oxide, titanium oxide, tantalum oxide and combinations thereof, the metal precursor used for the first stage can include halides (i.e., metal bonded to F, Cl, Br or I), alkyl compounds and alkoxides having the transition metal.

Depending on the desired structure and/or method, metal halide precursors can include aluminum chloride or iodide, zinc chloride or iodide, zirconium chloride or iodide, hafnium chloride or iodide, titanium chloride or iodide or tantalum chloride or iodide.

Depending on the desired structure and/or method, metal precursors with oxygen bonded to the metal can include alkoxides (M-(O—CR)n), such as hafnium tert-butoxide, $Hf(OC_4H_9)_4$, where each alkoxo ligand is bound to the metal atom through one O atom, and ß-diketonates (M=$(O_2C_3R_3)_n$, such as $Zr(thd)_4$, where each diketonato ligand is bound to the metal through two metal-oxygen bonds (the ligand "chelates" the metal center).

Depending on the desired structure and/or method, precursors with nitrogen bonded to the metal can include metal alkylamides $(M(NR_2)_n)$, such as hafnium dimethylamide, $Hf(N(CH_3)_2)_4$ and metal amidinates $(M(N_2CR_3)_n)$.

Organometallic precursors having metal atoms bound directly to carbon can also be used. Such organometallic precursors can include alkyls $M(C_xH_y)_n$, such as trimethylaluminum, $Al(CH_3)_3$; and cyclopentadienyls, such as dicyclopentadienyldimethylhafnium, $Hf(C_5H_5)_2(CH_3)_2$ (a mixed ligand precursor). Other precursors can be used.

Depending on the desired structure and/or method exposing the substrate to the oxidizing precursor can comprise exposing to a precursor comprising oxygen (O, $O_2$), ozone ($O_3$), water ($H_2O$), hydrogen peroxide ($H_2O_2$), nitrous oxide (NO, $N_2O$), ammonia ($NH_4$) or combinations thereof, according to embodiments. Other precursors such as other oxidizing precursors can be used.

A combination of different precursors can be used and can depend on which inorganic material is being incorporated into the periodically repeating base polymer structures 1204. For example, aluminum oxide may be deposited more easily from trimethylaluminum and water or ozone, while aluminum nitride may be made more easily from aluminum dimethylamide, $Al_2(N(CH_3)_2)_6$, and ammonia. For ALD of hafnium oxide and hafnium oxynitride, hafnium ethylmethylamide, $Hf(N(CH_3)(C_2H_5))_4$, may be a suitable liquid precursor, combining high reactivity toward water, ozone and ammonia, with sufficient volatility and stability.

In addition, as described above with respect to FIG. 10, polymer chains of the base polymer units may include various functional groups, e.g., carbonyl groups, hydroxyl groups and pyridine groups that are configured to react with a particular metal precursor to form the inorganic material. To provide one illustrative example, when the deposition chemistry includes $Al(CH_3)_3$ (TMA) and $H_2O$ for formation of $Al_2O_3$, then PMMA may be included in the polymeric base material, such that the carbonyl group of PMMA may react with TMA to form Al—OH species, which in turn reacts with $H_2O$ in a hydrolysis reaction to form $Al_2O_3$ that is incorporated in the base polymer structures 1204.

In reference to FIGS. 14A and 14B, based on the foregoing, various parameters including the exposure time, the purge time, the total or partial pressure, and substrate temperature can be selected to control the diffusion of precursors and/or the inorganic material to form the optical structures 1008 comprising a base polymer region 1008a and an infiltrated region 1008b infiltrated with the inorganic material. In some embodiments, the inorganic material is incorporated into surface regions of the optical structures 1008, such that each has the base polymer region 1008a comprising a core region of the optical structure that substantially does not have the inorganic material incorporated therein, and further has the infiltrated region 1008b comprising the surface region that has the inorganic material infiltrated therein.

Furthermore, the diffusion of precursors and/or the inorganic material can be controlled such that the width, depth, or thickness of the infiltrated region 1008b ($H_t$-$H_f$ and/or $W_t$-$W_f$) is greater than about 1 nm, 10 nm, 20 nm, 50 nm, 100 nm, 200 nm, 300 nm, or a thickness within a range defined by these values. Thicknesses outside these ranges are also possible. Accordingly, the base polymer region 1008a may be substantially free of the inorganic material. The base polymer region may have less than 40%, 30%, 20%, 10%, 5% or 1% of the inorganic material on the basis of the total volume of the base polymer region 1008a or may have any percentage in any range defined by these values. Percentages outside these ranges are also possible. In contrast, the infiltrated region 1008b is substantially infiltrated with the inorganic material. The infiltrated region 1008b may have more than 40%, 50%, 60%, 70%, 80%, 90%, 95%, or 99% of the inorganic material on the basis of the total volume of the base polymer region 1008a, or may have any percentage in any range defined by these values. Percentages outside these ranges are also possible.

However, the configurations are not so limited and in some other configurations, substantially all of the volumes of the periodically repeating base polymer structures 1204 are infiltrated with the inorganic material, such that, after infiltration, the base polymer structures 1204 are substantially free of base polymer regions 1008a that are free of the inorganic material.

As described above, one or more exposure conditions influence the diffusion characteristics of the precursor(s)

and/or the inorganic material. Without being bound to any theory, in some embodiments, at least some of the precursor(s) are diffused into the base polymer structures 1204 prior to forming the inorganic material. For example, at least a portion of a monolayer of the metal precursor may be diffused into the polymeric structures 1204 to a depth equal to or less than the depth of the infiltrated region 1008*b* to, e.g., react with a functional group of the base polymer material of the polymeric structures 1204. Thereafter, at least a portion of a monolayer of the oxidizing precursor may be diffused into the base polymer structures 1204 to a depth equal to or less than the depth of the infiltrated region 1008*b* to, e.g., react with the metal precursor, thereby forming at least a portion of the inorganic material inside of or under the surface of the periodically repeating base polymer structures 1204.

However, the configurations are not so limited. Without being bound to any theory, in some other embodiments, at least portions of the inorganic material are diffused into the base polymeric structures 1204 after being formed. For example, at least a portion of a monolayer of the inorganic material may be diffused into the polymeric structures 1204 to a depth equal to or less than the depth of the infiltrated region 1008*b*, after being formed at surfaces of the base polymer structures 1204.

Still referring to FIGS. 14A and 14B, advantageously, the base polymer material forming the periodically repeating polymeric structures 1204 has a composition, structure and density such that, after incorporating the inorganic material under various processing and material parameter as described above, the dimensions of the periodically repeating polymeric structures 1204 prior to incorporation of the inorganic material and the dimensions of the periodically repeating optical structures 1008 after incorporation of the inorganic material differ within a relatively limited amount. For example, for the designs such as the illustrated embodiment having a substantially rectangular cross-sectional shape, one or both of the width and the height change by less than 30%, 20%, 10%, 5% or 1%, or by a percentage within a range defined by these values although percent changes outside these ranges are also possible. Relatively little change in lateral dimensions is advantageous at least because the variability in critical dimensions as a result of processing is reduced.

According to some embodiments, the inorganic material is incorporated or infiltrated into the base polymer structures 1204 using process sequence similar to a thermal atomic layer deposition (ALD). A thermal ALD process is a deposition performed without use of a plasma. In some other embodiments, the inorganic material is incorporated or infiltrated using plasma-enhanced atomic layer deposition (PE-ALD). Whether thermal or PE-ALD is employed can depend on the dimensions and aspect ratios of the periodically repeating base polymer structures 1204. For example, for the base polymer structures 1204 having relatively high aspect ratio and/or relatively small spacing between adjacent polymer structures 1204, plasma may not reach into deeper regions of the high aspect ratio base polymer structures 1204 under some circumstances. Under these circumstances, when PE-ALD is employed, different portions of the base polymer structures 1204 may be exposed to different amounts of the plasma, leading to non-uniform deposition, e.g., thicker films being deposited near the upper regions of the base polymer structures 1204 compared to deeper regions. Instead, a thermal ALD may be more advantageous, because thermal ALD may not depend on the ability of the plasma to reach portions of the surface being deposited on. However, under other circumstances, PE-ALD may be more desirable, e.g., to allow for lower temperature deposition, because the plasma can lower activation energies of the ALD reaction.

In the above, example methods and apparatus were described in which the inorganic material is incorporated or infiltrated into the periodically repeating optical structures 1008 using processes related to ALD. However, the methods and apparatus are not so limited. Under some circumstances, e.g., where the inorganic material is formed prior to diffusion into the base polymer structures 1204 and/or where the dimensions of the base polymer structures 1204 and the spacing therebetween are relatively large, other deposition techniques may be employed, e.g., for faster throughput. For example, the inorganic material can be infiltrated using processes such as chemical vapor deposition (CVD), including plasma-based CVD processes, such as plasma-enhanced chemical vapor deposition (PECVD), and thermal-based CVD processes, such as low pressure chemical vapor deposition (LPCVD) in some cases. The inorganic material can also be infiltrated using physical vapor deposition (PVD) and evaporation, among other techniques.

According to various embodiments, advantageously, exposing the substrate to the metal precursor and the oxidizing precursor incorporates the inorganic material through exposed surfaces of the base polymer material selectively against exposed surfaces of the substrate. This is because, as described above, unlike surfaces of the periodically repeating base polymer structures 1204, the surface of the substrate 1004 does not have functional groups adapted for adsorbing, chemisorbing or reacting with the metal precursors. Thus, based on the selectivity of the adsorption, chemisorption or reaction of the metal precursor, variations in the periodically repeating optical structures can be formed, as described below with respect to FIGS. 14A/14B, 15A/15B and 16A/16B.

In the illustrated embodiment of FIGS. 14A and 14B, when the periodically repeating base polymer structures 1204 are formed, adjacent one of the periodically repeating base polymer structures are separated by a space 1012. Unlike surfaces of the base polymer structures 1204, surfaces of the substrate in the spaces 1012 do not have the base polymer material formed thereon. That is, prior to exposing precursors for incorporating the inorganic material into the polymer structures 1204, the base polymer material is completely removed between adjacent ones of the base polymer structures 1204, such that the surfaces of the substrate is exposed in the spaces 1012. Subsequently, because the exposed surfaces of the substrate do not have formed thereon the functional groups adapted for adsorbing, chemisorbing or reacting with the metal precursors, inorganic material does not form thereon.

Figure 16B:
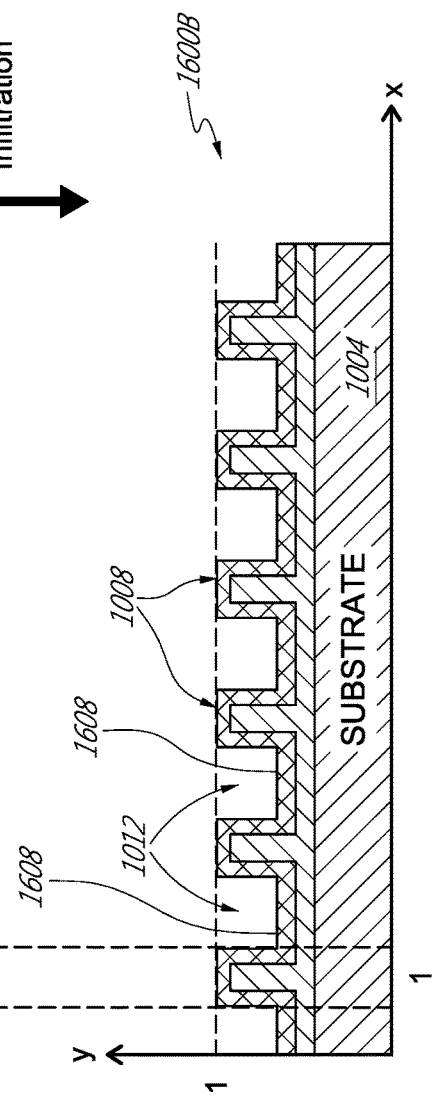

In reference to intermediate structures 1500A, 1600A of FIG. 15A, 16A, respectively, and to intermediate structures 1500B, 1600B of FIGS. 15B, 16B, respectively, methods of incorporating an inorganic material into periodically repeating base polymer structures 1204 (FIGS. 15A, 16A) to form periodically repeating optical structures 1008 (FIG. 15B, 16A) are described, according alternative embodiments. Various fabrication processes resulting in the intermediate structures 1500A, 1600A, and 1500B, 1600B, that are similar to fabrication processes resulting in the intermediate structures 1400A (FIG. 14A) and 1400B (FIG. 14B), respectively, are omitted herein, while differences are described herein. In the illustrated embodiment, unlike the embodiment illustrated with respect to FIGS. 14A/14B, forming the periodically repeating base polymer structures 1204 comprises forming adjacent ones of the periodically repeating base polymer structures 1204 separated by a space 1012 having a substrate surface on which a layer 1504 (FIG. 15A), 1604 (FIG. 16A) of base polymer material is formed thereon. That is, prior to incorporating the inorganic material in the base polymer structures 1204, the base polymer material is incompletely or partially removed between from the substrate surface in the space 1012. As a result, in the spaces 1012 between adjacent ones of protruding periodically repeating base polymer structures 1204, the surface of the substrate 1004 remains covered with a layer of the base polymer material. Subsequently, surfaces of protruding periodically repeating base polymer structures 1204, as well as surfaces of the polymer layers 1504 (FIG. 15A), 1604 (FIG. 16A) on the substrate in the spaces 1012 are exposed to precursors to incorporate the inorganic material. As described above, incorporation of the inorganic material may result from the presence of functional groups in the base polymer structures that adsorb or chemisorb the metal precursors, and from the subsequent reaction between the metal precursors and the oxidizing precursors. Alternatively, the incorporation may result from formation of the inorganic material on the surfaces of the polymer material that subsequently diffuses into the periodically repeating base polymer structures 1204 to form the periodically repeating optical structures 1008. As a result, the entire exposed surface, including surface regions of protruding optical structures 1008, as well as surfaces of the polymer layers 1508 (FIG. 15A), 1608 (FIG. 16A) on the substrate surface in the spaces 1012 between the adjacent ones of the optical structures 1008 incorporates the inorganic material.

In some embodiments, as illustrated in FIG. 15A, the layers 1504 of polymer material formed on substrate surfaces in the spaces 1012 have a relatively low thickness, e.g., a thickness similar or smaller than the thickness of the infiltrated region 1008b ($H_t$-$H_f$ and/or $W_t$-$W_f$). In these embodiments, after infiltration with the inorganic material, substantially the entire thicknesses of the layers 1508 of the polymer material in the spaces 1012 may (or may not) incorporate the inorganic material, as illustrated in FIG. 15B.

In some other embodiments, as illustrated in FIGS. 16A, the layers 1604 of polymer material formed on substrate surfaces in the spaces 1012 have a relatively high thickness, e.g., a thickness greater than the thickness of the infiltrated region 1008b ($H_t$-$H_f$ and/or $W_t$-$W_f$). In these embodiments, after infiltration with the inorganic material, part of the thicknesses of the layers 1608 of the polymer material in the spaces 1012 (a portion less that the total thickness) incorporate the inorganic material, in the surface regions, as illustrated in FIG. 16B.

Advantageously, incorporation of the inorganic material into the base polymer structures 1204 to form the optical structures 1008 results in an increase in the refractive index of the structures. According to embodiments, the substrate 1004 has a first refractive index that is greater than that of air but less than the second refractive index of the optical structures 1008, e.g., 1.5, 1.6, 1.7, 1.8, 1.9, or a value in a range defined by these values. Refractive indices outside these ranges are also possible. After incorporation of the inorganic material, in various embodiments, the second refractive index is greater than 1.7, 1.8, 1.9, 2.0 2.1 or a value in a range defined by these values and is greater than the first refractive index by at least 0.2, 0.4, 0.6, 0.8, 1.0, or a value in a range defined by these values. Refractive indices and increases in refractive index outside these ranges are also possible. Prior to incorporation of the inorganic material, the periodically repeating base polymer structures 1204 may have a refractive index that is substantially lower than the final second refractive index of the optical structures 1008. For example, the refractive index of the base polymer structures 1204 prior to incorporation of the inorganic material may be 1.3, 1.4, 1.5, 1.6, 1.7 or a value in a range defined by these values. For example, PMMA and polystyrene have refractive indices of about 1.49 and about 1.59, respectively, at about 588 nm. Upon incorporation of the inorganic material having a refractive index greater than 1.7, 2.0, 2.3, 2.6, 3.0, or a value in a range defined by these values, the refractive index of the base polymer structures 1204 can be increased, for example, to have a value in the ranges above. Thus, the refractive index may be increased by more than about 0.1, 0.2, 0.3, 0.4, 0.5 or increased to a value in a range defined by these values. Refractive indices and increases in refractive index outside these ranges are also possible.

Advantageously, incorporation of the inorganic material into the base polymer structures 1204 to form the optical structures 1008 may result in an increase in the mechanical stiffness, as measured by, e.g., Young's modulus (E). Prior to incorporation of the inorganic material according to embodiments disclosed herein, the Young's modulus of the periodically repeating base polymer structures 1204 may be within about 1.0 GPa and about 5 GPa. For example, PMMA may have a Young's modulus between about 2.5 and 3.5 GPa, for instance about 3.1 GPa, and polystyrene may have a Young's modulus between about 1.5 and 2.5 GPa, for instance about 2.0 GPa. Upon incorporation of the inorganic material, in various embodiments, the Young's modulus of the periodically repeating base polymer structures 1204 may increase by more than 1 GPa, 2 GPa, 5 GPa, 10 GPa or by a value within a range defined by these values. The Young's modulus of the resulting optical structures 1008 incorporating the inorganic material may be between about 2.5 GPa and about 17.5 GPa, between about 2.5 GPa and about 7.5 GPa, between about 7.5 GPa and about 12.5 GPa, between about 12.5 GPa and about 17.5 GPa. Values of Young's modulus outside these ranges are also possible.

Although specific oxides and nitrides are disclosed herein as comprising the inorganic material, other materials are possible. Additional, the oxides and nitrides may be formed by oxidation processes such as described herein or by other types of oxidation processes. Other materials may also be formed by oxidation processes. Still other types of processes may also be used.

Optical Elements Based on Geometric Phase Metasurfaces Comprising Polymeric Based Optical Structures Incorporating an Inorganic Material Metasurfaces may include surface structures that can locally modify the polarization, phase and/or amplitude of light in reflection or transmission. The metasurfaces may include an array of subwavelength-sized and/or subwavelength-spaced phase shift elements whose patterns are configured to control the wavefront of light, such that various optical functionalities can be derived therefrom, including beam shaping, lensing, beam bending, and polarization splitting. The factors that can be used to manipulate the wavefront of the light include the material, size, geometry and orientation of the surface structures. By arranging the surface structures with distinct scattering properties on a surface, space-variant metasurfaces can be generated, throughout which optical wavefronts can be substantially manipulated.

In conventional optical elements such as lenses and waveplates, the wavefront is controlled via propagation phases in a medium much thicker than the wavelength.

Unlike conventional optical elements, metasurfaces instead induce phase changes in light using subwavelength-sized resonators as phase shift elements. Because metasurfaces are formed of features that are relatively thin and uniform in thickness, they can be patterned across a surface using thin film processing techniques such as semiconductor processing techniques, as well as direct-printing techniques such as nanoimprint techniques.

As described above, polymeric optical elements incorporating inorganic materials are relatively easy to fabricate, while providing tunable refractive index and stiffness. As a result, the polymeric optical elements incorporating inorganic materials are excellent candidates for optical elements based on metasurfaces. In the following optical elements, e.g., diffraction gratings, based on metasurfaces formed of polymer-based optical structures incorporating inorganic materials are described.

Without being bound to any theory, when a light beam is taken along a closed cycle in the space of polarization states of light, it may acquire a dynamic phase from the accumulated path lengths as well as from a geometric phase. The dynamic phase acquired from a geometric phase is due to local changes in polarization. Some optical elements based on a geometric phase to form a desired phase front may be referred to as Pancharatnam-Berry phase optical elements (PBOEs). PBOEs may be constructed from wave plate elements for which the orientation of the fast axes depends on the spatial position of the waveplate elements.

Without be limited by theory, by forming a metasurface with half-wave plates formed of geometric phase optical elements, e.g., PBOEs, with their fast axes orientations according to a function $\theta(x,y)$, an incident circularly polarized light beam may be fully transformed to a beam of opposite helicity having a geometric phase equal to $\phi_g(x,y) =+/-2\theta(x,y)$. By controlling the local orientation of the fast axes of the wave plate elements between 0 and $\pi$, phase pickups/retardations may be achieved that cover the full 0-to-$2\pi$ range, while maintaining relatively high and uniform transmission amplitude across the entire optical element, thereby providing a desired wavefront.

In the following, with reference to FIGS. 17A-17H, a construction 1700 of a geometric PBOE based on a plurality of geometrically rotated waveplate elements is described, where each waveplate element comprises a pattern of periodically repeating optical structures (1008 in FIGS. 10, 14B, 15B, 16B) as described above, according to embodiments. In particular, the PBOE configured as a half-wave plate with a phase retardation of $\pi$ is described. In the illustrated embodiment, eight neighboring half-waveplate elements are be arranged as being equally spaced and feature a constant orientation-angle difference $\Delta\theta$ between neighboring waveplates. However, it will be appreciated that less or more numbers of waveplate elements may be employed with different orientation-angle difference $\Delta\theta$ between neighboring waveplates. For illustrative purposes, the bottom row schematically depicts the rotation of the polarization vector of an incident light beam with left circular polarization, i.e. a |LCP> state. The middle row illustrates half-wave plate elements constructed from a plurality of periodically repeating optical structures similar to those described with reference to FIGS. 14B, 15B and 16B, with their fast axis oriented at different angles $\theta$ relative to the vertical axis. The top row schematically illustrates corresponding polarization vectors of the light behind transmitted through the waveplate elements. Circular polarizations and anti-clockwise orientation angles of fast axis of waveplate are defined from the point of view of the light source.

Still referring to FIGS. 17A-17H, the incident light beam may be described by polarization vectors 1704 and 1708 having equal amplitudes in the x and y directions, respectively, and a phase delay 1712 of $\pi/2$ between the polarization vectors. In operation, the half waveplate works by shifting the phase between the two perpendicular polarizations by a phase of $\pi$. The net result of this action is to flip the electric field directed along the slow axis and to maintain the electric field along the fast axis. This action may also be viewed as one in which the original polarization vector is flipped to its mirror image with the fast axis serving as the mirror. When considering a helical incident state in which a polarization vector that rotates in time, one may see that the action of the waveplate is to switch helicity from |LCP> to |RCP>, or vice versa.

Referring to the bottom row of FIG. 17A, the electric field of an incident |LCP> beam is directed upward in the positive y axis at an initial time $t=t_0$, as indicated by the vector 1704. A quarter of an optical cycle later (i.e., $\pi/2$), the light is directed along the negative y-direction, as represented by the vector 1708. The action of the waveplate in the middle row of FIG. 17A is to mirror the vectors 1704 and 1708 in a mirror placed in the plane of the fast axis and the propagation direction of the light. The action of this mirror is to flip the vector 1704 to the positive x-direction and to keep the vector 1208 in the original direction. As a result, the |LCP> beam is transformed into a |RCP> beam.

FIGS. 17B-17H illustrate how the polarization vectors of an |LCP> beam changes when the fast axes of the waveplates are rotated by an angle $\theta$ of $\pi/4$, $\pi/2$, $3\pi/4$, $\pi$, $5\pi/4$, $3\pi/2$ and $7\pi/4$, respectively. Independent of the rotation angle, a |RCP> output beam is produced. However, the produced phase delay of the vectors 1704 and 1708 with reference to FIG. 17A is given by $\varphi_g=2\theta$. For example, when $\theta=\pi/2$ as shown in FIG. 17E, the action of the waveplate it to keep the vector 1704 in the same direction while flipping the vector 1708 from the negative y-direction into the positive y-direction. This produces a |RCP> beam that is delayed by $\varphi_g=2\theta=\pi$ for incident light of LCP. As such, for the illustrated half waveplate, it will take half an optical cycle longer before the state shown in FIG. 17A is reached.

Thus, as an illustrative example, after passing through the eight half-waveplate elements that are equally spaced and feature a constant orientation-angle difference, e.g., $\Delta\theta=\pi/8$ between neighbors, the transmitted RCP waves display a constant phase difference $\Delta\varphi_g=\pi/4$ between neighboring waveplates. By using eight waveplate elements with fast-axes orientation varying between 0 and $\pi$, phase retardations/pickups may be achieved that covers the full 0-$2\pi$ range. However, fabricating half-wave plate elements having a high diffraction angle for visible light may be challenging. This is because the diffraction angle depends, among other things, on the length of a period of periodically repeating waveplate elements, and forming the relatively high number of half-waveplate elements within a relatively small length of the period may be difficult due to spatial constraints.

In FIGS. 17A-17H, for illustrative purposes, the illustrated half-wave plate included eight equally spaced neighboring half-waveplate elements having a constant orientation-angle difference $\Delta\theta$ between neighboring waveplates, where each waveplate element included a pattern of periodically repeating polymer-based optical structures having incorporated therein an inorganic material. However, embodiments are not so limited and in the following, embodiments of diffraction grating in which phase retardations/pickups may be achieved that covers the full 0-$2\pi$ range at relatively high diffraction angles and diffraction efficiencies, as well as uniformity of diffraction efficiencies across a relatively wide angle of incidence, with less numbers of waveplate elements.

Applications of the metasurfaces comprising PBOEs include diffraction gratings, e.g., blazed gratings, focusing lenses, and axicons, among various other applications. As described herein, a blazed grating is capable of steering a light beam into several diffracted orders. The blazed grating may be configured to achieve high grating efficiency in one or more diffraction orders, e.g., +1 and/or −1 diffraction orders, thus resulting in the optical power being concentrated in the desired diffraction order(s) while the residual power in the other orders (e.g., the zeroth) is low. In the present disclosure, various embodiments of metasurfaces comprising PBOEs configured as diffraction gratings are described. The diffraction gratings according to various embodiments have a combination of desirable optical properties, including one or more of high diffraction angle, high diffraction efficiency, a wide range of acceptance angle and a highly uniform diffraction efficiency within the range of acceptance angle. These desirable optical properties may result from a combination of various inventive aspects, including the material, dimensions and geometric configurations of the elements of the metasurfaces.

As described herein, visible light may include light having one or more wavelengths in various color ranges, including red, green, or blue color ranges. As described herein, red light may include light of one or more wavelengths in the range of about 620-780 nm, green light may include light of one or more wavelengths in the range of about 492-577 nm, and blue light may include light of one or more wavelengths in the range of about 435-493 nm. Thus, visible may include light of one or more wavelengths in the range of about 435 nm-780 nm.

As described herein, features, e.g., as nanobeams, lines, line segments or unit cells, that are parallel, nominally parallel or substantially parallel, refer to features having elongation directions that differ by less than about 10%, less than about 5% or less than about 3% in the elongation directions. In addition, features that are perpendicular, nominally perpendicular or substantially perpendicular refer to features having elongation directions that deviate from 90 degrees in the elongation directions by less than about 10%, less than about 5% or less than about 3%.

As described herein, structures configured to diffract light, such as diffraction gratings, may diffract light in a transmission mode and/or reflection mode. As described herein, structures that are configured to diffract light in transmission mode refer to structures in which the intensity of diffracted light on the opposite side of the structures as the light-incident side is greater, e.g., at least 10% greater, 20% greater or 30% greater, compared to the intensity of diffracted light on the same side of the structures as the light-incident side. Conversely, structures that are configured to diffract light in reflection mode refer to structures in which the intensity of diffracted light on the same side of the structures as the light-incident side is greater, e.g., at least 10% greater, 20% greater or 30% greater, compared to the intensity of diffracted light on the opposite side of the structures as the light-incident side.

As described herein, a line, also referred to as a beam or nanobeam, is an elongated structure having a volume. The lines or nanobeams are formed of a polymer material having incorporated therein an inorganic material, as described above. It will be appreciated that the lines are not limited to any particular cross-sectional shape. In some embodiments, the cross-sectional shape is rectangular.

Figure 18A:
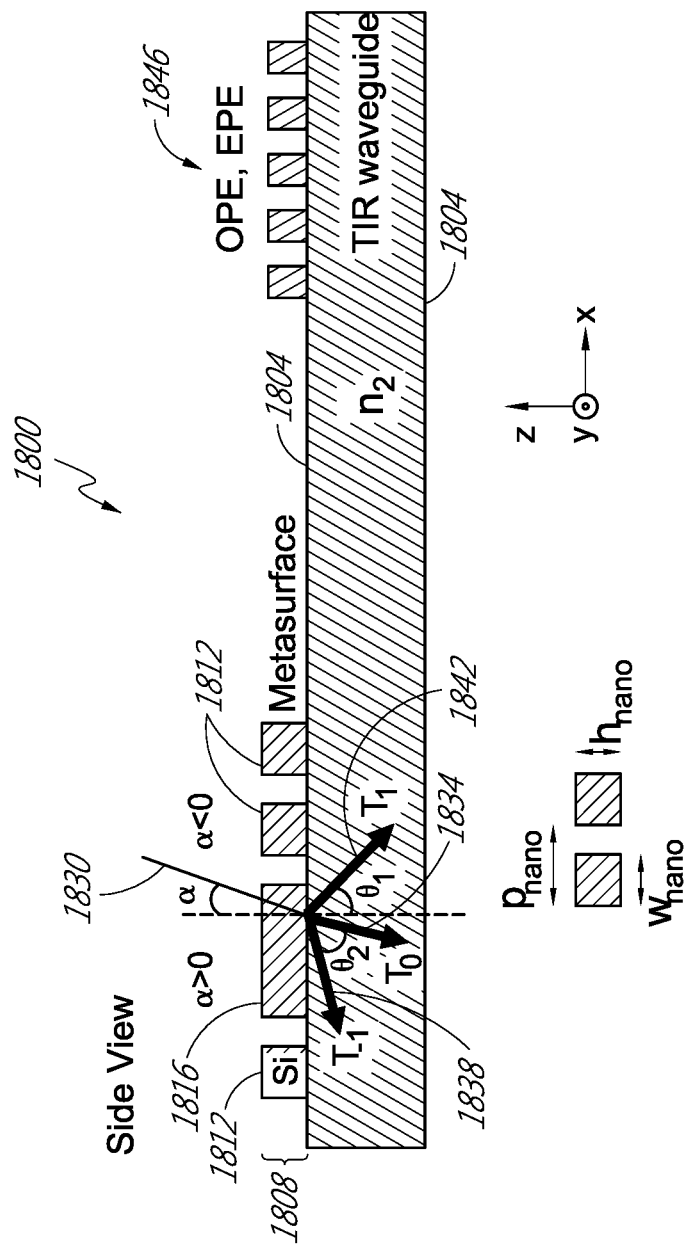
FIG. 18A illustrates a cross-sectional side view of a diffraction grating having 2-phase level geometric phase optical elements formed of polymer-based optical structures having incorporated therein an inorganic material.
Figure 18B:
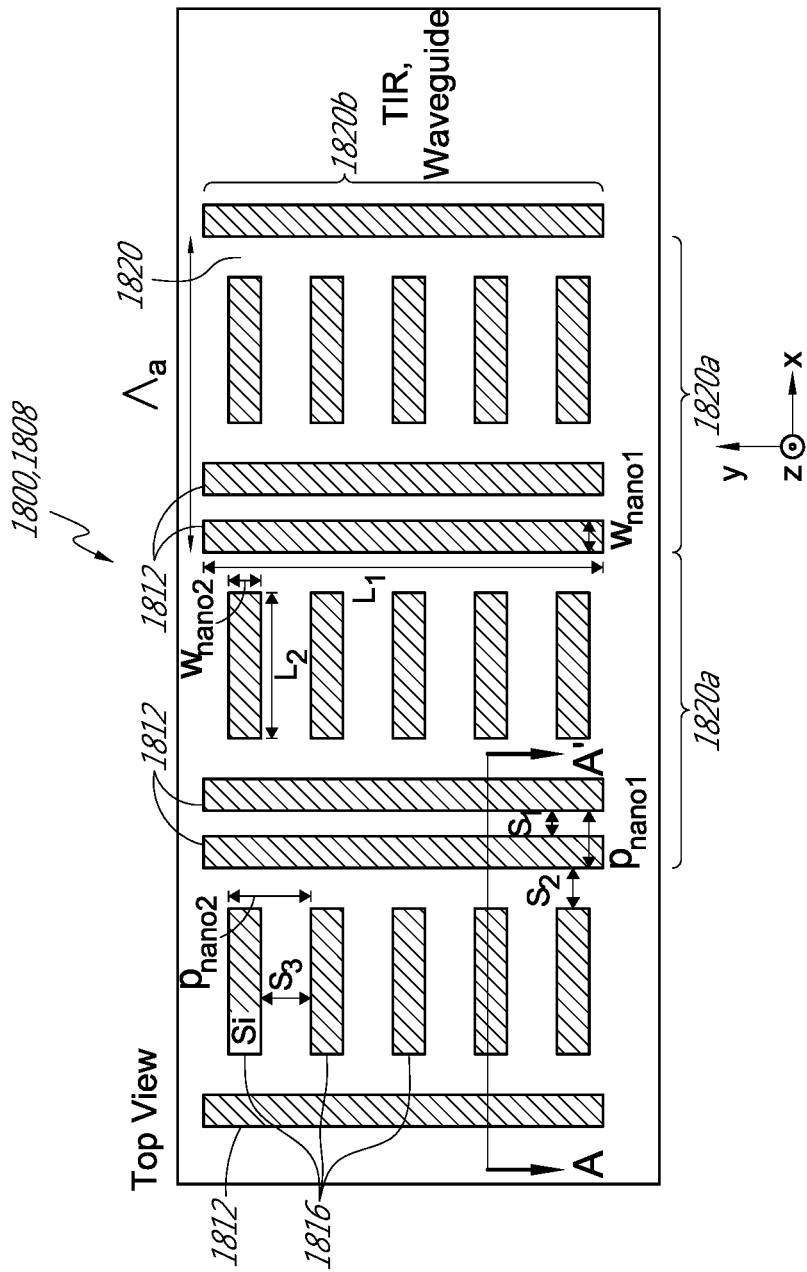
FIG. 18B illustrates a top-down view of the diffraction grating of FIG. 18A.

FIGS. 18A and 18B illustrate a cross-sectional side view and a top-down view, respectively, of a diffraction grating 1800 comprising a metasurface having geometric phase optical elements, according to some embodiments. The diffraction grating 1800 comprises a 2-level geometric phase metasurface. The cross-sectional side view illustrated with reference to FIG. 18A is that of a cross-section AA' illustrated in FIG. 18B. The diffraction grating 1800 includes a substrate 1804 having a surface on which a metasurface 1808 configured to diffract light having a wavelength in the visible spectrum is formed. The metasurface 1808 includes one or more first lines or nanobeams 1812 having a first orientation and extending generally in a first lateral direction (e.g., the y-direction) and a plurality of second lines or nanobeams 1816 having a second orientation extending generally in a second direction (e.g., the x-direction). The one or more first lines or nanobeams 1812 and the plurality of second lines or nanobeams are formed of a polymer material having incorporated therein an inorganic material, as described above. The first lines or nanobeams 1812 may be considered to form a first set of nanobeams and the second lines or nanobeams 1816 may be considered to form a second set of nanobeams. The one or more first lines 1812 and the second lines 1816 are disposed adjacent to one another in the second direction, and the first lines 1812 and the second lines 1816 alternatingly repeat in the second direction at a period less than the wavelength of light which the metasurface is configured to diffract.

Preferably, the first lines 1812 each have the same width. In some embodiments, the second lines 1816 are laterally stacked in the y-direction between adjacent pairs of the one or more first lines 1812. Without be limited by theory, the one or more first lines 1812 and the second lines 1816 are oriented at an angle relative to each other to preferably cause a phase difference between the visible light diffracted by the one or more first lines 1812 and the visible light diffracted by the second lines 1816, where the phase difference between the visible light diffracted by the one or more first lines 1812 and the visible light diffracted by the second lines 1816 is twice the angle.

In some embodiments, similar to the combination of wave plates illustrated above with reference to FIGS. 17A-17H, the phase difference caused by the relative orientations of one or more first lines 1812 relative to the second lines 1816, which may vary between 0 and $\pi$, phase pickups/retardations may be achieved that covers the full 0-$2\pi$ range. In some embodiments, when the one of the one or more first lines 1812 and the second lines 1816 are rotated by $\pi$ relative to the other, e.g., perpendicular to each other, a phase pickup/retardation of $2\pi$ may be achieved between the one or more first lines 1812 and the second lines 1816. That is, unlike FIGS. 18A-18H, phase pickups/retardations covering the full 0-$2\pi$ range may be achieved based on the 2-level geometric phase metasurface having lines oriented in just two different directions, according to some embodiments. Advantageously, unlike FIGS. 17A-17H, the combination of wave plates illustrated with reference to FIGS. 17A-17H, the foot print occupied by the illustrated metasurface 1808 is more compact, and has a period less than or equal to a wavelength in the visible spectrum, which in turn enables a relatively high diffraction angle $\theta$ of the diffracted beams 1838, 1842.

The first lines 1812 and the second lines 1816 are formed of an optically transmissive material. As described herein and throughout the specification, a "transmissive" or "transparent" structure, e.g., a transmissive substrate, may allow at least some, e.g., at least 20, 30, 50, 70 or 90%, of an incident light, to pass therethrough. Accordingly, a transparent substrate may be a glass, sapphire or a polymeric substrate in some embodiments. A "reflective" structure, e.g., a reflective substrate, may reflect at least some, e.g., at least 20, 30, 50, 70, 90% or more of the incident light, to reflect therefrom.

The one or more first lines 1812 and the second lines 1816 may be described as being protrusions, ridges creases or nanowires that protrude out of the page, extend along the page, and having a width. Additionally or alternatively, regions of separation between adjacent first lines 1812 and/or between adjacent second lines 1816 may be described as being depressions, troughs, recesses or trenches that recess into the page and having a spacing. In some embodiments, the first lines 1812 and the second lines 1816 are elongated rectangular structures having a substantially rectangular cross-sectional shape in the y-z plane. However, other embodiments are possible, where the first lines 1812 and the second lines 1816 have cross sectional shape may take on a shape of a circle, an ellipse, a triangle, a parallelogram, a rhombus, a trapezoid, a pentagon or any suitable shape.

In the following, various configurations including dimensions and geometric arrangements of the one or more first lines 1812 and the second lines 1816 are described, whose combined effect is to produce the grating based on geometric phase optical elements with desirable optical properties described herein, including one or more of a relatively high diffraction angle, a relatively high diffraction efficiency, a relatively wide range of acceptance angle and a relatively uniform efficiency within the range of acceptance angle.

Still referring to FIGS. 18A and 18B, in operation, when an incident light beam 1830, e.g., visible light, is incident on the metasurface 1808 at an angle of incidence $\alpha$ measured relative to a plane normal to the surface 1804S and extending in a direction parallel to the first lines 1812, e.g., the y-z plane, the grating 1800 partially transmits the incident light as a transmitted light beam 1834 and partially diffracts the incident light as a diffracted light beam of +1 order 1842 at a diffraction angle $\theta_1$ and a diffracted light beam of −1 order 1838 at a diffraction angle $\theta_2$, where the diffraction angles are measured relative to the same plane for measuring $\alpha$, e.g., the y-z plan. When one or both of the diffracted light beams 1838 and 1842 are diffracted at a diffraction angle that exceeds a critical angle $\theta_{TIR}$ for occurrence of total internal reflection in the substrate 1804 configured as a waveguide, the diffracted light beams 1838 and 1842 propagate in their respective opposite directions along the x-axis under total internal reflection (TIR) until the light beams reach the OPE's/EPE's 1846, which may correspond to the light distributing elements 730, 740, 750 and the outcoupling optical elements 800, 810, 820 (FIG. 9B).

Without being bound to any theory, when the first lines 1812 and the second lines 1816 having subwavelength feature sizes support leaky mode resonances they may confine light, thereby causing phase retardation in the scattered light waves produced under TE and TM illumination. It has been found that the effectiveness of confinement of light in the one or more first lines 1812 and the second lines 1816 may arise from being configured as waveguides operating as resonators, and the resulting diffraction efficiency may depend on, among other factors, the refractive index of the material and subwavelength dimensions of the first lines 1812 and the second lines 1816.

Accordingly, in some embodiments, the first lines 1812 and/or the second lines 1816 are formed of a material having relatively high index of refraction. Accordingly, as described above, according to embodiments, the first lines 1812 and/or the second lines 1816, after incorporation of the inorganic material, have the second refractive index that is greater than 1.7, 1.8, 1.9, 2.0 or 2.1 and is greater than the first refractive index by at least 0.2, 0.4, 0.6, 0.8 or 1.0.

With continued reference to FIGS. 18A and 18B, in addition to being formed of various materials described above, the one or more first lines 1812 and the second lines 1816 have particular combination of dimensions to serve as subwavelength-sized resonators that induce phase shifts in light.

In various embodiments, each of $W_{nano1}$ of the first lines 1812 and $W_{nano2}$ of the second lines 1816 is smaller than the wavelength of light the metasurface 1808 is configured to diffract, and is preferably smaller than a wavelength in the visible spectrum. In some embodiments, each of $W_{nano1}$ and $W_{nano2}$ is in the range of 10 nm to 1 μm, 10 nm to 500 nm, 10 nm to 300 nm, 10 nm to 100 nm or 10 nm to 50 nm, for instance 30 nm. According to some embodiments, each of the one or more first lines 1812 has the same width $W_{nano1}$. According to some embodiments, each of the second lines 1816 has the same width $W_{nano2}$. According to some embodiments, the one or more first lines 1812 and the second lines 1816 have the same width, i.e., $W_{nano1}=W_{nano2}$. However, in some other embodiments, $W_{nano1}$ and $W_{nano2}$ may be substantially different. Furthermore, in some embodiments, different ones of the one or more first lines 1812 and/different ones of the second lines 1816 may have different widths.

According to some embodiments, immediately adjacent ones of the one or more first lines 1812 in the second direction are separated by a constant spacing $s_1$. In addition, one of the one or more first lines 1812 and one of the second lines 1816 that are immediately adjacent to one another in the second direction are separated by a constant spacing $s_2$. According to some embodiments, one or both of $s_1$ and $s_2$ are smaller than the wavelength the metasurface 1808 is configured to diffract. In addition, the first lines 1812 and the second lines 1816 have heights $h_{nano1}$ and $h_{nano2}$, respectively. A particular combination of the spacings $s_1$, $s_2$ and the heights $h_{nano1}$ and $h_{nano2}$ may be chosen such that a desired range ($\Delta\alpha$) of angle of incidence $\alpha$, sometimes referred to as a range of angle of acceptance or a field-of-view (FOV), is obtained. As described herein. the desired range $\Delta\alpha$ may be described by a range of angles spanning negative and positive values of $\alpha$, outside of which the diffraction efficiency falls off by more than 10%, 25%, more than 50%, or more than 75%, relative to the diffraction efficiency at $\alpha=0$. Having the $\Delta\alpha$ within which the diffraction efficiency is relatively flat may be desirable, e.g., where uniform intensity of diffracted light is desired within the $\Delta\alpha$. Referring back to FIG. 18A, the incident light beam 1830 is incident on the metasurface 1808 and surface of the waveguide 1804 at an angle $\alpha$ relative to a surface normal, e.g., the y-z plane. According to some embodiments, as described above, the $\Delta\alpha$ is associated with the angular bandwidth for the metasurface 1808, such that the light beam 1830 within the $\Delta\alpha$ is efficiently diffracted by the metasurface 1808 at a diffraction angle $\theta$ with respect to a surface normal (e.g., the y-z plane). In particular, when $\theta$ is or exceeds $\theta_{TIR}$, the diffracted light propagates within the substrate 1804 under total internal reflection (TIR).

It has been found that $\Delta\alpha$ may depend on a shadowing effect created by adjacent ones of one or more first lines 1812 in the second direction and immediately adjacent ones of the second lines 1816 in the first direction. That is, when the incident light beam 1830 is incident at an angle of incidence α that is greater than a certain value, the incident light beam directed towards a feature may be blocked by an immediately adjacent feature. For example, the Δα may be associated with the arctangent of $s_1/h_{nano1}$, $s_2/h_{nano1}$ and/or $s_2/h_{nano1}$. In various embodiments, the ratios $s_1/h_{nano1}$, $s_2/h_{nano1}$ and/or $s_2/h_{nano1}$ are selected such that Δα exceeds 20 degrees (e.g., +/−10 degrees), 30 degrees (e.g., +/−15 degrees), 40 degrees (e.g., +/−20 degrees) or 50 degrees (e.g., +/−25 degrees), or is within a range of angles defined by any of these values. The desired ratios $s_1/h_{nano1}$, $s_2/h_{nano1}$ and/or $s_2/h_{nano1}$ may be realized where, e.g., each of $s_1$ and $s_2$ is in the range of 10 nm to 1 µm, 10 nm to 300 nm, 10 nm to 100 nm or 10 nm to 50 nm, for instance 30 nm. Of course, relatively lower values of $s_1$ and $s_2$ may be realized by where $h_{nano1}$ and $h_{nano2}$ have correspondingly relatively lower values.

Advantageously, the relatively high refractive index ($n_2$) of the material of the one or more first lines 1812 and/or the second lines 1816 according to some embodiments allow for a relatively small thickness or height. Accordingly, in various embodiments, the first lines 1812 and the second lines 1816 have $h_{nano1}$ and $h_{nano2}$, which may be in the range of 10 nm to 1 µm, 10 nm to 500 nm, 10 nm to 300 nm, 10 nm to 100 nm and 10 nm to 50 nm, for instance 107 nm, according to some embodiments, depending on the $n_1$. For example, the $h_{nano1}$ and $h_{nano2}$ may be 10 nm to 450 nm where $n_2$ is more than 3.3, and 10 nm to 1 µm where $n_1$ is 3.3 or less. As another example, the height the first lines 1812 and the second lines 1816 may be 10 nm to 450 nm.

According to various embodiments, the combination of $s_1$ and $W_{nano1}$ may be selected such that a pitch ($p_{nano1}$) of the one or more first lines 1812, defined as a sum of $s_1$ and $W_{nano1}$, has a value obtained by a sum of $W_{nano1}$ selected from ranges of 10 nm to 1 µm, 10 nm to 500 nm, 10 nm to 300 nm, 10 nm to 100 nm or 10 nm to 50 nm, and $s_1$ selected from ranges of 10 nm to 1 µm, 10 nm to 300 nm, 10 nm to 100 nm or 10 nm to 50 nm, for instance $p_{nano1}$=95.5 nm.

Of course, relatively small values of $s_1$ and $s_2$ may be realized and $h_{nano1}$ and $h_{nano2}$ have correspondingly relatively small values. Advantageously, using a material with relatively high refractive index $n_1$ to form the one or more first lines 1812 and/or the second lines 1816, relatively small values of $s_1$, $s_2$, $h_{nano1}$ and $h_{nano2}$ may be obtained. This is because, as the inventors have found, the $h_{nano1}$ and $h_{nano2}$ may be inversely proportional to the bulk refractive index of the material forming the first lines 1812 and the second lines 1816. Accordingly, for the polymer-based optical structures having the refractive index values as described above, the $h_{nano1}$ and $h_{nano2}$ may be in the range of 500 nm to 1 µm, 300 nm to 500 nm, 100 nm to 300 nm and 10 nm to 100 nm, respectively, in various embodiments. Thus, by the particular combination of a material having a high bulk refractive index $n_1$ of the one or more first lines 1812 and the second lines 1816 and the corresponding dimensions $s_1$, $s_2$, $h_{nano1}$ and $h_{nano2}$, the overall pitch $\Lambda_a$ may also be correspondingly decreased, which in turn increases the diffraction angle θ, as described further below.

Preferably, the $h_{nano1}$ and $h_{nano2}$ are substantially equal, which may be advantageous for fabrication. However, embodiments are not so limited and the $h_{nano1}$ and $h_{nano2}$ may be substantially different.

In various embodiments, the first lines 1812 and/or the second lines 1816 are formed of a material whose bulk refractive index ($n_{2\ bulk}$) is higher than the refractive index $n_1$ of the substrate 1804; i.e., $n_{2\ bulk} > n_1$. In some embodiments, the substrate 1804 may be configured as a waveguide, and may correspond to the waveguides 310, 300, 290, 280, 270 (FIG. 6) and/or waveguides 670, 680, and 690 (FIG. 9A). In such applications, the substrate preferably has a refractive index that is between that of air but less than $n_{1\ bulk}$, e.g., 1.5, 1.6, 1.7, 1.8, 1.9, or higher but less than $n_{2\ bulk}$, which may provide benefits for increasing the Δα of a display that forms an image by outputting light from that substrate 1816.

Still referring to FIGS. 18A and 18B, the metasurface 1808 may be described as forming a plurality of metasurface unit cells 1820 that repeat at least in the x-direction. As described herein, a metasurface unit cell 1820 may be defined as a footprint having the smallest repeating dimension in the x-direction, which includes the one or more first lines 1812 the second lines 1816. As an example, each unit cell 1820 spans a unit cell width 1820a measured from the left vertical side of the left one of the first lines 1812 of one unit cell 1820 to the left vertical side of the left vertical side of the left one of the first lines 1812 of an immediately adjacent unit cell 1820, and thereby includes a pair of first lines 1812 and a column of second lines 1816 stacked in the y-direction in the illustrated embodiments.

As described herein, the lateral dimension of the metasurface unit cells 1820, or the period of repeating units of the unit cells 1820, may be referred to herein as a unit cell pitch $\Lambda_a$. The pitch $\Lambda_a$ repeats at least twice at regular intervals across the waveguide 1804 in the x-direction. In other words, the unit cell pitch $\Lambda_a$ may be the distance between identical points of directly neighboring unit cells 1820. In various embodiments, the $\Lambda_a$ may be smaller than the wavelength the grating 1800 is configured to diffract, and may be smaller than a wavelength, or any wavelength, in the range of about 435 nm-780 nm. In some embodiments configured to diffract at least red light, the $\Lambda_a$ may be less than a wavelength (or any wavelength) in the range of about 620-780 nm. In some other embodiments configured to diffract at least green light, the $\Lambda_a$ may be less than a wavelength (or any wavelength) in the range of about 492-577 nm. In some other embodiments configured to diffract at least blue light, the $\Lambda_a$ may be less than a wavelength (or any wavelength) in the range of about 435-493 nm. Alternatively, according to various embodiments, the $\Lambda_a$ may be in the range of 10 nm to 1 µm, including 10 nm to 500 nm or 300 nm to 500 nm. It will be appreciated that each of the metasurfaces disclosed herein may be utilized to diffract light and may be part of the display system 250 (FIG. 6) and that the display system 1000 may be configured to direct light to the metasurface having a narrow band of wavelengths. Preferably, the $\Lambda_a$ for a given metasurface is less than the smallest wavelength of the band of wavelengths that a light source of the display system is configured to direct to the metasurface.

It has been found that, in some embodiments, the $\Lambda_a$ may have a value that is less than a ratio mλ/(sin α+$n_2$ sin θ), where m is an integer (e.g., 1, 2, 3 . . . ) and α, $n_2$ and θ each have values described elsewhere in the specification. For example, α may be within the range Δα exceeding 40 degrees, $n_2$ may be in the range of 1-2, and θ may be in the range of 40-80 degrees.

In some embodiments, the $E_a$ may be substantially constant across the surface 1804S of the grating 1800 formed by a plurality of unit cells. However, embodiments are not so limited and in some other embodiments, $\Lambda_a$ may vary across the surface 1804S.

Still referring to FIG. 18B, in some embodiments, each of the second lines 1816 is shorter length than each of the one or more first lines 1812 by at least a factor of two, three, four or more. However, embodiments in which the second lines 1816 are longer than the one or more first lines 1812 are possible. According to various embodiments, the one or more first lines 1812 may have a length $L_1$ in the range of 200 μm-5 mm, 200 μm-1 mm or 1 mm-5 mm. According to various embodiments, the second lines 1816 may have a length $L_2$ in the range of 100 nm-500 nm, 100 nm-300 nm and 300 nm-500 nm. In some embodiments, the one or more first lines 1812 may have a length $L_1$ corresponding to a total lateral dimension of the optical element formed by the metasurface, e.g., corresponding to a length of an incoupling or outcoupling optical element formed by the metasurface comprising the lines 1812. In some embodiments, the second lines have a length $L_2$ that is about 40% to about 60% of a unit cell pitch $\Lambda_a$, for instance about 50% of $\Lambda_a$. In some embodiments, $L_1$ is such that the one or more first lines 1812 span a distance in the y-direction corresponding to five second lines 1816. However, it will be understood that the one or more first lines 1812 may span a distance in the y-direction corresponding to any suitable number of second lines 1816 greater than one, e.g., greater than 10, greater than 20, greater than 50 or greater than 100, or in a range between any of 10, 20 and 100, according to various embodiments.

Still referring to FIGS. 18A and 18B, in some embodiments, each of the second lines 1816 have the same length such that the second lines 1816 extend in the x-direction and coterminate without crossing any of the one or more first lines 1812. However, embodiments in which the second lines 1816 have different lengths are possible.

Still referring to the illustrated embodiment of FIG. 18A, the direction of extension (y-direction) of the one or more first lines 1812 is substantially perpendicular to the direction of extension (x-direction) of the second lines 1816. That is, the second lines 1816 are rotated relative to the one or more first lines 1812 by and angle of rotation of π/2 when viewed a direction of propagation of an incident light (i.e., into the page). However, embodiments are not so limited, and the second lines 1816 may extend in any direction that is rotated in a counterclockwise direction by an angle smaller than π/2 when viewed a direction of propagation of an incident light (i.e., into the page). For example, the second lines 1816 may be rotated relative the one or more first lines 1812 in a similar manner that the nanobeams of wave plates illustrated in FIGS. 17B-17H are rotated relative to the waveplate illustrated in FIG. 17A. For example, the second lines 1816 may be rotated by relative to the one or more first lines 1812 by an angle of rotation θ of π/4, π/2, 3π/4, π, 5π/4, 3π/2 and 7π/4, respectively. Thus, when an |LCP> beam is incident on the metasurface 1808 having the first and second lines 1812 and 1816, a |RCP> output beam is produced, where the resulting phase delay of the polarization vectors corresponding to TE and TM polarizations may have a value of $\varphi_g = 2\theta$, where θ is the angle of rotation changes when the fast axes of the waveplates are rotated by an angle of rotation θ. In particular, for the illustrated embodiment, the second lines 1816 that rotated by θ=π/2 relative to the one or more first lines 1812 diffracts an incident light beam, e.g., an |LCP> beam, whereby a diffracted |RCP> beam is generated, where the diffracted beam is delayed by $\varphi_g = 2\theta = \pi$ by the second lines 1816. Thus, as the illustrated embodiment, after passing through the metasurface 1808 in which the alternating one or more first lines 1812 and the second lines 1816 in the x-direction have a constant orientation-angle difference of Δθ=π/2, the transmitted RCP waves display a constant phase difference $\Delta\varphi_g = \pi$ between adjacent ones of the one or more first lines 1812 and the second lines 1816. As a result, by having the fast-axes orientation vary between 0 and π, phase pickups/retardations that covers the full 0-2π range may be achieved, but with a much more compact unit cell pitch and higher diffraction angles compared to the illustrated example in FIGS. 17A-17H.

Display Devices Having Geometric Phase Metasurface-Based Gratings Formed of Polymer-Based Optical Structures Incorporating an Inorganic Material As disclosed herein, in various embodiments described above, the periodic polymer-based optical structures having inorganic material incorporated therein, which can be configured as a metasurface, may be implemented as an incoupling optical element (e.g., as one or more of the incoupling optical elements 700, 710, 720 (FIG. 9A)) to incouple incident light such that the light propagates through the substrate 1304 via total internal reflection. However, in recognition that the metasurface 1808 may also be configured to deflect light impinging on it from within the substrate 1804, in some embodiments, the metasurfaces disclosed herein may be applied to form outcoupling optical elements, such as one or more of the outcoupling optical elements 570, 580, 590, 600, 610 (FIG. 6) or 800, 810, 820 (FIG. 9B) instead of, or in addition to, forming an incoupling optical element at different locations on the surface 2000a. In some other embodiments, the metasurface 1808 may be utilized as light distributing elements (e.g., OPE's) 730, 740, 750 (FIG. 9B). Where different waveguides have different associated component colors, it will be appreciated that the outcoupling optical elements and/or the incoupling optical elements associated with each waveguide may have a geometric size and/or periodicity specific for the wavelengths or colors of light that the waveguide is configured to propagate. Thus, different waveguides may have metasurfaces with different arrangements of the one or more first lines 1812 and the second lines 1816. In particular, the different arrangements may depend on the wavelength or the color of the incident light beam. For example, depending on the color of the incident light beam, the $\Lambda_a$ may be configured differently according to the wavelength the grating 1800 is configured to diffract. For example, for diffracting at least red light, green light or blue light, the metasurface 1808 may be configured to have a $\Lambda_a$ that is less than wavelengths in the range of about 620-780 nm, less than wavelengths in the range of about 492-577 nm, and less than wavelengths in the range of about 435-493 nm, respectively. To scale the $\Lambda_a$, parameters such as refractive indices, widths, heights and spacings of the one or more first lines 1312 and/or the second lines 1316 may be adjusted proportionally. Alternatively, $\Lambda_a$ may be kept relatively uniform for different wavelengths of the incident light by compensating for one or more of sin α, n2 and sin θ, as described above.

Figure 19:
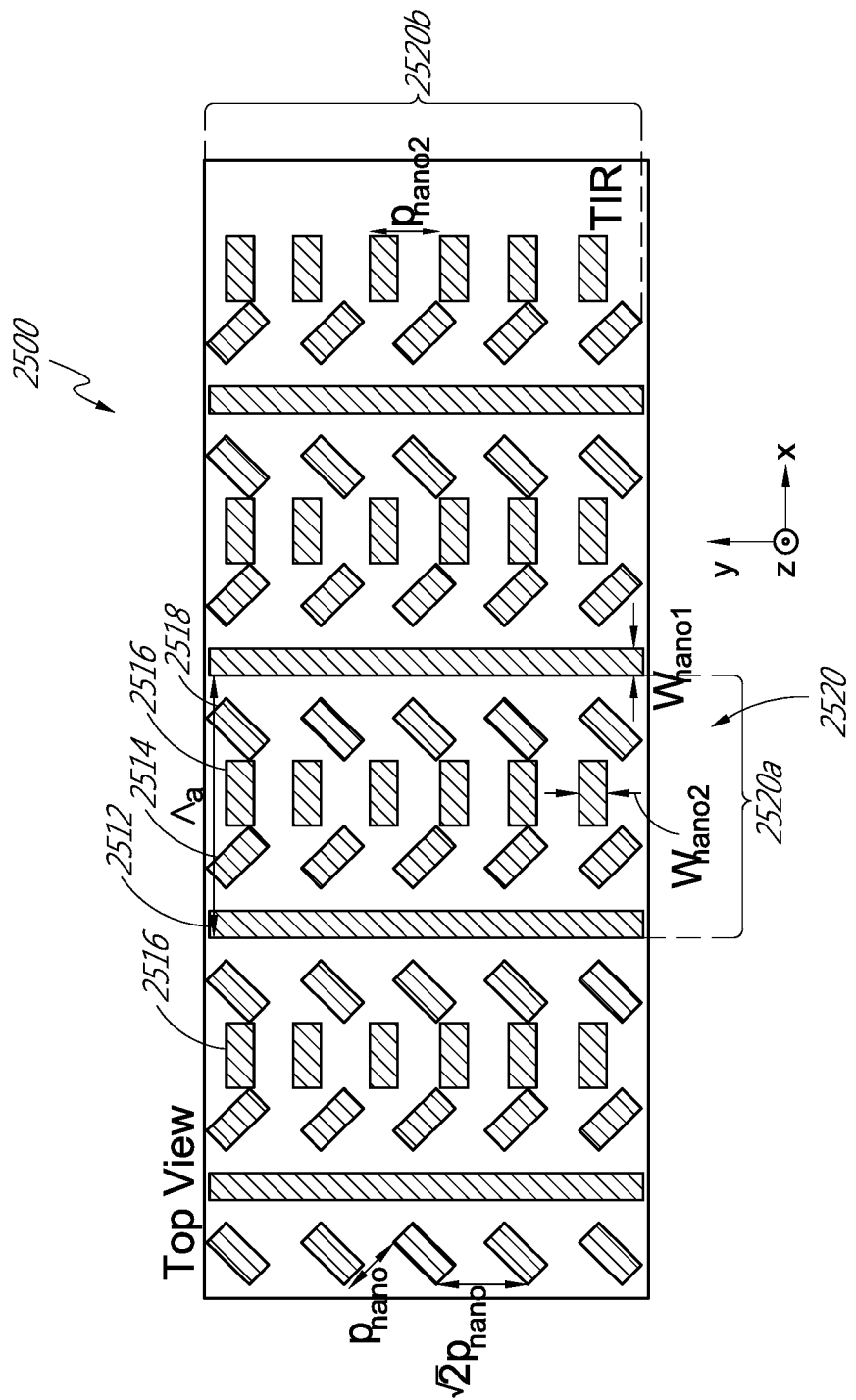
FIG. 19 illustrates a top-down view of a diffraction grating having 4-phase level geometric phase optical elements formed of polymer-based optical structures having incorporated therein an inorganic material.

FIG. 19 illustrate a top-down view of a diffraction grating 2500 comprising a metasurface having geometric phase optical elements, according to some other embodiments. It will be appreciated that some embodiments of metasurfaces disclosed herein may be formed of two to four sets of nanobeams, each extending in a different direction. FIGS. 18A-18B illustrate metasurfaces having two sets of nanobeams, and FIG. 19 illustrates metasurface having four sets of nanobeams. In particular, the diffraction grating 2500 of FIG. 19 comprises a 4-level geometric phase metasurface. Similar to the diffraction grating 1800 described above with reference to FIGS. 18A and 18B, the diffraction grating 2500 includes a substrate, e.g., a waveguide, on which a metasurface configured to diffract light having a wavelength in the visible spectrum is formed. The metasurface includes one or more first lines 2512 extending in a first lateral direction (e.g., the y-direction) and a plurality of second lines 2516 extending in a second direction (e.g., the x-direction). The one or more first lines 2512 and the second lines 2516 are disposed adjacent to one another in the second direction, where the first lines 2512 and the second lines 2516 alternatingly repeat in the second direction at a period less than a wavelength in the visible spectrum which the metasurface is configured to diffract. In some embodiments, the second lines 2516 are laterally stacked in the y-direction between adjacent pairs of first lines 2512. Various features of the one or more first lines 1812 and the second lines 1816 of the diffraction grating 2500 are similar to corresponding features of the diffraction grating 1800 described above with reference to FIGS. 18A and 18B, except for the following differences.

Unlike the diffraction grating 1800 described above with reference to FIGS. 18A and 18B, the diffraction grating 2500 further comprises one or both of a plurality of third lines 2514 each extending in a third direction and a plurality of fourth lines 2518 each extending in a fourth direction. Each of the first, second, third, and fourth directions may be different from one another. The plurality of third lines 2514 may be considered to form a third set of nanobeams and the plurality of fourth lines 2518 may be considered to form a fourth set of nanobeams. The third lines 2514 are disposed on a first side of the second lines 2516 and are interposed in the second direction (e.g., x-axis direction) between one or more first lines 2512 and the second lines 2516. The fourth lines 2518 are disposed on a second side of the second lines 2516 opposite to the first side and are interposed in the second direction (e.g., x-direction) between another one or more first lines 2512 and the second lines 2516.

Unlike the diffraction grating 1800 described above with reference to FIGS. 18A and 18B, the diffraction grating 2500 may have only one first line 2512. In some other embodiments, the diffraction grating 2500 may have a plurality of first lines 2512, e.g., a pair of first lines such as the diffraction grating 1800 described above with reference to FIGS. 18A and 18B.

In some embodiments, the third lines 2514 have the same length and/or the fourth lines 2518 have the same length, such that the third lines 2514 and/or the fourth lines 2518 coterminate in the third and fourth directions, respectively. However, other embodiments are possible, in which different ones of the third lines 2514 and/or different ones of the fourth lines 2518 do not coterminate. In addition, in some embodiments, coterminating third lines 2514 and coterminating fourth lines 2518 have the same length. However, in other embodiments, coterminating third lines 2514 and coterminating fourth lines 2518 have different lengths.

In some embodiments, adjacent ones of the third lines 2514 are separated by a constant spacing in the first direction (e.g., y-direction), and/or adjacent ones of the fourth lines 2518 are separated by a constant spacing in the first direction. However, other embodiments are possible, in which third lines 2514 and/or the fourth lines 2518 are not separated by constant spacings. In addition, in some embodiments, constantly-spaced third lines 2514 and constantly-spaced fourth lines 2518 have the same constant spacing. However, in other embodiments, constantly-spaced third lines 2514 and constantly-spaced fourth lines 2518 have different spacings.

In some embodiments, the third lines 2514 have the same width and/or the fourth lines 2518 have the same width. However, in other embodiments, the third lines 2514 and/or the fourth lines 2518 have different widths. In addition, in some embodiments, widths of the third lines 2514 having the same width and the fourth lines 2518 having the same width are the same. However, in some other embodiments, widths of the third lines 2514 having the same width and the fourth lines 2518 having the same width are different. In addition, in some embodiments, the third lines 2514 and the fourth lines 2518 have the same width as one or both of first lines 2512 and second lines 2416.

In some embodiments, the third lines 2514 extend in the third direction that is rotated in a counterclockwise direction relative to the one or more first lines 2512 by an angle smaller than the smallest angle of rotation of the second lines 2516 relative to the one or more first lines 2512 when viewed a direction of propagation of an incident light (e.g., into the page). In some embodiments, the second lines 2516 are rotated by 90° or π/2 relative to the one or more first lines 2512, and the third lines 2514 are rotated by 45° or π/4 relative to the one or more first lines 2512. In addition, the fourth lines 2518 extend in the fourth direction that is rotated in the counterclockwise direction relative to the one or more first lines 2512 by an angle greater than the smallest angle of rotation of the second lines 2516 relative to the one or more first lines 2512 when viewed the direction of propagation of an incident light. In some embodiments, the second lines 2516 are rotated by 90° or π/2 relative to the one or more first lines 2512, and the third lines 2514 are rotated by 135° or 3π/4 relative to the one or more first lines 2512.

In some embodiments, similar to the combination of wave plates illustrated above with reference to FIG. 17A-17H, the phase differences caused by the relative orientations of one or more first lines 2512, the second lines 2516, the third lines 2514 and the fourth lines 2518, may vary between 0 and π. When the third lines 2514, the fourth lines 2518 and the second lines 2516 and are rotated relative to the one or more first lines 2512 by π/4, 3π/4 and π, phase pickups/retardations of π/2, 3π/2 and 2π may be achieved, respectively, such that the phase pickups/retardations covering the full 0-2π range may be achieved, according to some embodiments. As a result, by having the fast-axes orientation vary between 0 and π, phase pickups/retardations that covers the full 0-2π range may be achieved, but with a much more compact unit cell pitch and higher diffraction angles compared to the illustrated example in FIGS. 12A-12H.

Display Devices Based on Geometric Phase Metasurfaces Comprising Polymeric Based Optical Structures Incorporating an Inorganic Material In various embodiments of a display system (e.g., with reference back to FIGS. 9A and 9B) a set 1200 of waveguides may include the periodic polymer-based optical structures having inorganic material incorporated therein, which can be configured as metasurface diffraction gratings that are configured to operate in transmission mode. In various embodiments, the set 1200 of waveguides includes waveguides 670, 680, 690 corresponding to each component color (R, G, B), which in turn has formed therein or thereon respective ones of incoupling optical elements 700, 710, 720, which may include or correspond to the diffraction gratings 1300, 2500 described above with reference to FIGS. 18A and 18B and 19. The waveguides 670, 680, 690 additionally has formed therein or thereon respective ones of light distributing elements (e.g., OPE's) 730, 740, 750 and/or outcoupling optical elements (e.g., EPE's) 800, 810, 820, which include or correspond to EPE/OPE 1846 described above with reference to FIGS. 18A and 18B. In operation, in some embodiments, when an incident light beam 1830, e.g., visible light, is incident on the metasurface 1808 at an angle of incidence α, the grating 1800, 2500 diffracts the incident light into a diffracted light beam 1842,

1838 at a diffraction angle $\theta_2$. When one or both of the diffracted light beams 1838 and 1842 are diffracted at diffraction angles that exceed a critical angle $\theta_{TIR}$ for occurrence of total internal reflection for the substrate 1804 configured as a waveguide having an index of refraction $n_2$, i.e., when one or both of conditions $\theta_2 > \theta_{TIR}$ and $\theta_1 > \theta_{TIR}$ are satisfied, the one or both of the diffracted light beams 1838 and 1842 propagate in their respective opposite directions along the x-axis by total internal reflection (TIR). Subsequently, in some embodiments, the diffracted light beam 1846 coupled into the substrate 1804 under TIR mode until it reaches an orthogonal pupil expanders (OPE) 1846 or an exit pupil expander (EPE) 1846, described above with reference to FIGS. 9A and 9B.

It will be appreciated that substrates 1804 configured as waveguides having formed thereon metasurfaces according to various embodiments may be used to form display systems, such as the system 250 (FIG. 6) disclosed herein. For example, the metasurfaces may be utilized as incoupling, light distributing and/or outcoupling optical elements as descried herein. In some embodiments, after fabrication of the metasurface, the waveguide 2000 may be optically coupled to a light pipe, such as a light pipe for injecting image information into the waveguide from a spatial light modulator. The light pipe may be an optical fiber in some embodiments. Examples of light pipes include the image injection devices 360, 370, 380, 390, 400 (FIG. 6) and scanning optical fibers. In some embodiments, a plurality of waveguides each having metasurfaces 1808 may be provided, and each of these waveguides may be optically coupled to one or more image injection devices.

ADDITIONAL EXAMPLES

1. A method of fabricating an optical element, comprising:
providing a substrate having a first refractive index and transparent in the visible spectrum;
forming on the substrate periodically repeating polymer structures; and
exposing the substrate to a metal precursor followed by an oxidizing precursor,
wherein exposing is performed under a pressure and at a temperature such that an inorganic material comprising the metal of the metal precursor is incorporated into the periodically repeating polymer structures, thereby forming a pattern of periodically repeating optical structures configured to diffract visible light, the optical structures having a second refractive index greater than the first refractive index.

2. The method of Example 1, wherein exposing is performed under a pressure between about 100 mTorr and about 10 Torr.

3. The method of Example 1 or Example 2, wherein exposing is performed at a temperature lower than about 150 degrees Celsius.

4. The method of any one of the preceding Examples, wherein forming the periodically repeating polymer structures comprises patterning by nanoimprinting.

5. The method of any one of the preceding Examples, wherein forming the periodically repeating polymer structures comprises lithographically patterning.

6. The method of any of the preceding Examples, wherein the periodically repeating polymer structures are formed of a material whose bulk refractive index is less than the second refractive index and the inorganic material has a bulk refractive index higher than the second refractive index.

7. The method of any one of the preceding Examples, wherein the second refractive index is greater than 1.7 and is greater than the first refractive index by at least 0.2.

8. The method of any of the preceding Examples, wherein the substrate has a refractive index greater than 1.5.

9. The method of any one of the preceding Examples, wherein the periodically repeating polymer structures comprise a photoresist.

10. The method of any one of the preceding Examples, wherein exposing the substrate to the metal precursor comprises exposing to a precursor comprising a transition metal selected from the group consisting of aluminum, zinc, zirconium, hafnium and titanium.

11. The method of any one of the preceding Examples, wherein exposing the substrate to the metal precursor and the oxidizing precursor comprises exposing at partial pressures of the respective precursors and for durations that are sufficient to saturate exposed surfaces of the periodically repeating polymer structures with at least a monolayer of the inorganic material.

12. The method of any one of the preceding Examples, wherein exposing the substrate to one or both of the metal precursor and the oxidizing precursor comprises exposing for a duration exceeding 1 sec.

13. The method of any one of the preceding Examples, wherein the inorganic material incorporated into the periodically repeating polymer structures comprises a metal oxide.

14. The method of Example 13, wherein the metal oxide comprises a transition metal oxide.

15. The method of Example 14, wherein the metal oxide comprises an oxide selected from the group consisting of aluminum oxide, zinc oxide, zirconium oxide, hafnium oxide and titanium oxide.

16. The method of any one of the preceding Examples, wherein exposing incorporates the inorganic material through exposed surfaces of the periodically repeating polymer structures selectively against exposed surfaces of the substrate.

17. The method of Example 16, wherein forming the periodically repeating polymer structures comprises separating by a space, the space having a substrate surface on which a polymer layer is not disposed thereon, wherein exposing does not result in deposition of the inorganic material on the substrate surface in the space or incorporation of the inorganic material through the substrate surface in the space.

18. The method of Example 16, wherein forming the periodically repeating polymer structures comprises separating by a space, the space having a substrate surface on which a polymer layer is disposed thereon, the polymer layer having a thickness smaller than heights of the periodically repeating polymer structures, wherein exposing incorporates the inorganic material into the polymer layer formed on the substrate surface in the space.

19. The method of Example 18, wherein the polymer layer formed on the substrate surface in the space has an entire thickness incorporating the inorganic material.

20. The method of Example 18, wherein the polymer layer formed on the substrate surface in the space has a partial thickness incorporating the inorganic material and a partial thickness not incorporating the inorganic material.

21. An optical element, comprising:
a substrate having a first refractive index and transparent in the visible spectrum; and
a pattern of periodically repeating optical structures formed on the substrate and configured to diffract visible light, the optical structures having a second refractive index greater than the first refractive index and comprising a polymeric material having incorporated therein an inorganic material.

22. The optical element of Example 21, wherein the polymeric material has a bulk refractive index less than the second refractive index and the inorganic material has a bulk refractive index higher than the second refractive index.

23. The optical element of Example 21 or Example 22, wherein the second refractive index is greater than 1.7 and is greater than the first refractive index by at least 0.2.

24. The optical element of any one of Examples 21-23, wherein the substrate has a refractive index greater than 1.5.

25. The optical element of any one of Examples 21-24, wherein the polymeric material comprises a photoresist.

26. The optical element of any one of Examples 21-25, wherein the inorganic material comprises a transition metal oxide.

27. The optical element of Example 26, wherein the inorganic material comprises a metal oxide.

28. The optical element of Example 27, wherein the metal oxide comprises an oxide selected from the group consisting of aluminum oxide, zinc oxide, zirconium oxide, hafnium oxide and titanium oxide.

29. The optical element of Example 27, wherein the inorganic material is incorporated into surface regions of the optical structures and core regions of the optical structures do not have the inorganic material incorporated therein.

30. The optical element of any one of Examples 21-29, wherein adjacent ones of the periodically repeating optical structures are separated by a space, wherein a surface of the substrate in the space does not have the inorganic material disposed thereon.

31. The optical element of any one of Examples 21-30, wherein adjacent ones of the periodically repeating optical structures are separated by a space, wherein the surface of the substrate in the space has formed thereon a layer of polymeric material having incorporated therein the inorganic material, the layer of polymeric material having a thickness smaller than heights of the optical structures.

32. The optical element of Example 31, wherein the layer of polymeric material formed in the space has an entire thickness incorporated with the inorganic material.

33. The optical element of Example 31, wherein the layer of polymeric material formed in the space has a partial thickness incorporated with the inorganic material at a surface region and a partial thickness not incorporated with the inorganic material.

34. The optical element of any one of Examples 21-33, wherein the substrate is configured such that visible light diffracted by periodically repeating optical structures propagate under total internal reflection.

35. An optical system, comprising:
an optical element, comprising:
a substrate having a first refractive index and transparent in the visible spectrum, and
a pattern of periodically repeating optical structures formed on the substrate and configured to diffract visible light, the optical structures having a second refractive index greater than the first refractive index and comprising a polymeric material having incorporated therein an inorganic material,
wherein the periodically repeating optical structures comprise nanobeams arranged as a metasurface, the metasurface comprising a plurality of repeating unit cells, each unit cell comprising:
a first set of nanobeams formed by one or more first nanobeams, and
a second set of nanobeams formed by one or more second nanobeams disposed adjacent to the one or more first nanobeams and separated from each other by a sub-wavelength spacing,
wherein the one or more first nanobeams and the plurality of second nanobeams are elongated in different orientation directions.

36. The optical system of Example 35, wherein the unit cells repeat at a period less than or equal to about 10 nm to 1 μm.

37. The optical system of Example 35 or Example 36, wherein the one or more first nanobeams and the second nanobeams are oriented at an angle relative to each other to cause a phase difference between the visible light diffracted by the one or more first nanobeams and the visible light diffracted by the second nanobeams.

38. The optical system of any one of Examples 35-37, wherein the one or more first nanobeams and the second nanobeams are oriented in orientation directions that are rotated by about 90 degrees relative to each other.

39. The optical system of any one of Examples 35-38, wherein the unit cells repeat at a period less than or equal to the wavelength, wherein the wavelength is within the visible spectrum.

40. The optical system of any one of Examples 35-39, wherein the one or more first nanobeams and the second nanobeams have a height smaller than the wavelength.

41. An optical system comprising a waveguide configured to propagate visible light, the optical system comprising:
a substrate having a first refractive index and transparent in the visible spectrum such that light can be guided therein by total internal reflection; and
a pattern of periodically repeating optical structures formed on the substrate and configured to diffract visible light, the optical structures having a second refractive index greater than the first refractive index and comprising a polymeric material having incorporated therein an inorganic material,
wherein the periodically repeating optical structures are arranged to diffract light at a diffraction angle relative to the direction of an incident light and to cause the diffracted light to propagate in the substrate under total internal reflection or are arranged to diffract light guided within the substrate under total internal reflection at a diffraction angle relative to the direction of light guided within the substrate.

42. The optical system of Example 41, wherein the polymeric material has a bulk refractive index less than the second refractive index and the inorganic material has a bulk refractive index higher than the second refractive index.

43. The optical system of Example 41 or Example 42, wherein the second refractive index is greater than 1.7 and is greater than the first refractive index by at least 0.2.

44. The optical system of any one of Examples 41-43, wherein the diffraction angle exceeds 50 degrees.

45. The optical system of any one of Examples 41-44, further comprising a light source configured to emit light of the wavelength to the pattern of periodically repeating optical structures.

46. The optical system of any one of Examples 41-45, further comprising a spatial light modulator configured to modulate light from the light source and to output the modulated light to the pattern of periodically repeating optical structures.

47. A head-mounted display device configured to project light to an eye of a user to display augmented reality image content, the head-mounted display device comprising:
 a frame configured to be supported on a head of the user;
 a display disposed on the frame, at least a portion of the display comprising:
  one or more waveguides, the one or more waveguides being transparent and disposed at a location in front of the user's eye when the user wears the head-mounted display device such that the transparent portion transmits light from a portion of an environment in front of the user to the user's eye to provide a view of the portion of the environment in front of the user;
  one or more light sources; and
  at least one diffraction grating configured to couple light from the light sources into the one or more waveguides or to couple light out of the one or more waveguides, the diffraction grating comprising an optical element, the optical element comprising:
   a substrate having a first refractive index and transparent in the visible spectrum; and
   a pattern of periodically repeating optical structures formed on the substrate and configured to diffract visible light, the optical structures having a second refractive index greater than the first refractive index and comprising a polymeric material having incorporated therein an inorganic material.

48. The device of Example 47, wherein the one or more light sources comprises a fiber scanning projector.

49. The device of Example 47 or Example 48, wherein the display is configured to project light into the user's eye so as to present image content to the user on a plurality of depth planes.

50. The method of any one of Examples 1-20, wherein exposing is performed under a pressure less than 10 atm (atmospheric pressure).

51. The method of any one of Examples 1-20 and 50, wherein exposing is performed at a temperature greater than 25 degrees Celsius.

52. The method of any one of Examples 1-20 and 50-51, wherein exposing the substrate to one or both of the metal precursor and the oxidizing precursor comprises exposing for a duration between about 1 sec. and about 1000 sec.

53. The method of any one of Examples 1-20 and 50-52, wherein the inorganic material incorporated into the periodically repeating polymer structures comprises a metal nitride.

54. The optical element of any one of Examples 21-34, wherein the periodically repeating optical structures comprise a metasurface.

55. The optical element of any one of Examples 21-34 and 54, wherein the substrate is configured such that visible light is guided therein under total internal reflection and is diffracted out of the substrate by periodically repeating optical structures.

56. The optical element of any one of Examples 21-34 and 54-55, wherein the substrate is configured such that visible light is guided therein under total internal reflection and is diffracted by periodically repeating optical structures so as to alter the direction of light beam propagating within the substrate by total internal reflection.

57. The optical system of any one of Examples 41-46, wherein the periodically repeating optical structures are arranged to diffract light at a diffraction angle relative to the direction of an incident light and to cause the diffracted light to propagate in the substrate under total internal reflection.

58. The optical system of any one of Examples 41-46 and 57, wherein the periodically repeating optical structures are arranged to diffract light guided within the substrate under total internal reflection at a diffraction angle relative to the direction of light guided within the substrate.

59. The optical system of Example 58, wherein the periodically repeating optical structures are arranged to diffract light guided within the substrate under total internal reflection out of the substrate.

60. A method of fabricating an optical element, comprising:
 providing a substrate transparent in the visible spectrum;
 forming on the substrate periodically repeating polymer structures having a first refractive index; and
 exposing the substrate to a metal precursor followed by an oxidizing precursor,
 wherein exposing is performed under a pressure and at a temperature such that an inorganic material comprising the metal of the metal precursor is incorporated into the periodically repeating polymer structures, thereby increasing the refractive index of the periodically repeating polymer structures to form a pattern of periodically repeating optical structures configured to diffract visible light.

61. The method of Example 60, wherein exposing is performed under a pressure between about 100 mTorr and about 10 Torr.

62. The method of Example 60 or Example 61, wherein exposing is performed at a temperature lower than about 150 degrees Celsius.

63. The method of any one of Examples 60-62, wherein forming the periodically repeating polymer structures comprises patterning by nanoimprinting.

64. The method of any one of Examples 60-63, wherein forming the periodically repeating polymer structures comprises lithographically patterning.

65. The method of any one of Examples 60-64, wherein the periodically repeating polymer structures are formed of a material whose bulk refractive index is less than the refractive index of the periodically repeating optical structures and the inorganic material has a bulk refractive index higher than the refractive index of the periodically repeating optical structures.

66. The method of any one of Examples 60-65, wherein the refractive index of the periodically repeating optical structures is greater than 1.7 and is greater than the refractive index of the periodically repeating polymer structures by at least 0.2.

67. The method of any one of Examples 60-66, wherein the substrate has a refractive index greater than 1.5.

68. The method of any one of Examples 60-67, wherein the periodically repeating polymer structures comprise a photoresist.

69. The method of any one of Examples 60-68, wherein exposing the substrate to the metal precursor comprises exposing to a precursor comprising a transition metal selected from the group consisting of aluminum, zinc, zirconium, hafnium and titanium.

70. The method of any one of Examples 60-69, wherein exposing the substrate to the metal precursor and the oxidizing precursor comprises exposing at partial pressures of the respective precursor and for durations that are sufficient to saturate exposed surfaces of the periodically repeating polymer structures with at least a monolayer of the inorganic material.

71. The method of any one of Examples 60-70, wherein exposing the substrate to one or both of the metal precursor and the oxidizing precursor comprises exposing for a duration exceeding 1 sec.

72. The method of any one of Examples 60-71, wherein the inorganic material incorporated into the periodically repeating polymer structures comprises a metal oxide.

73. The method of Example 72, wherein the metal oxide comprises a transition metal oxide.

74. The method of Example 73, wherein the metal oxide comprises an oxide selected from the group consisting of aluminum oxide, zinc oxide, zirconium oxide, hafnium oxide and titanium oxide.

75. The method of any one of Examples 60-74, wherein exposing incorporates the inorganic material through exposed surfaces of the periodically repeating polymer structures selectively against exposed surfaces of the substrate.

76. The method of Example 75, wherein forming the periodically repeating polymer structures comprises separating by a space, the space having a substrate surface on which a polymer layer is not disposed thereon, wherein exposing does not result in deposition of the inorganic material on the substrate surface in the space or incorporation of the inorganic material through the substrate surface in the space.

77. The method of Example 75, wherein forming the periodically repeating polymer structures comprises separating by a space, the space having a substrate surface on which a polymer layer is disposed thereon, the polymer layer having a thickness smaller than heights of the periodically repeating polymer structures, wherein exposing incorporates the inorganic material into the polymer layer formed on the substrate surface in the space.

78. The method of Example 77, wherein the polymer layer formed on the substrate surface in the space has an entire thickness incorporating the inorganic material.

79. The method of Example 77, wherein polymer layer formed on the substrate surface in the space has a partial thickness incorporating the inorganic material and a partial thickness not incorporating the inorganic material.

80. A method of fabricating an optical element, comprising:
providing a substrate having a first refractive index and transparent in the visible spectrum, wherein the substrate has formed thereon periodically repeating polymer structures; and
exposing the substrate to a metal precursor followed by an oxidizing precursor,
wherein exposing is performed under a pressure and at a temperature such that an inorganic material comprising the metal of the metal precursor is incorporated into the periodically repeating polymer structures, thereby forming a pattern of periodically repeating optical structures configured to diffract visible light, the optical structures having a second refractive index greater than the first refractive index.

81. The method of Example 80, wherein exposing is performed under a pressure between about 100 mTorr and about 10 Torr.

82. The method of Example 80 or Example 81, wherein exposing is performed at a temperature lower than about 150 degrees Celsius.

83. The method of any one of Examples 80-82, wherein forming the periodically repeating polymer structures comprises patterning by nanoimprinting.

84. The method of any one of Examples 80-83, wherein forming the periodically repeating polymer structures comprises lithographically patterning.

85. The method of any of Examples 80-84, wherein the periodically repeating polymer structures are formed of a material whose bulk refractive index is less than the second refractive index and the inorganic material has a bulk refractive index higher than the second refractive index.

86. The method of any one of Examples 80-85, wherein the second refractive index is greater than 1.7 and is greater than the first refractive index by at least 0.2.

87. The method of any of Examples 80-86, wherein the substrate has a refractive index greater than 1.5.

88. The method of any one of Examples 80-87, wherein the periodically repeating polymer structures comprise a photoresist.

89. The method of any one of Examples 80-88, wherein exposing the substrate to the metal precursor comprises exposing to a precursor comprising a transition metal selected from the group consisting of aluminum, zinc, zirconium, hafnium and titanium.

90. The method of any one of Examples 80-89, wherein exposing the substrate to the metal precursor and the oxidizing precursor comprises exposing at partial pressures of the respective precursors and for durations that are sufficient to saturate exposed surfaces of the periodically repeating polymer structures with at least a monolayer of the inorganic material.

91. The method of any one of Examples 80-90, wherein exposing the substrate to one or both of the metal precursor and the oxidizing precursor comprises exposing for a duration exceeding 1 sec.

92. The method of any one of Examples 80-91, wherein the inorganic material incorporated into the periodically repeating polymer structures comprises a metal oxide.

93. The method of Example 92, wherein the metal oxide comprises a transition metal oxide.

94. The method of Example 93, wherein the metal oxide comprises an oxide selected from the group consisting of aluminum oxide, zinc oxide, zirconium oxide, hafnium oxide and titanium oxide.

95. The method of any one of Examples 80-94, wherein exposing incorporates the inorganic material through exposed surfaces of the periodically repeating polymer structures selectively against exposed surfaces of the substrate.

96. The method of Example 95, wherein forming the periodically repeating polymer structures comprises separating by a space, the space having a substrate surface on which a polymer layer is not disposed thereon, wherein exposing does not result in deposition of the inorganic material on the substrate surface in the space or incorporation of the inorganic material through the substrate surface in the space.

97. The method of Example 95, wherein forming the periodically repeating polymer structures comprises separating by a space, the space having a substrate surface on which a polymer layer is disposed thereon, the polymer layer having a thickness smaller than heights of the periodically repeating polymer structures, wherein exposing incorporates the inorganic material into the polymer layer formed on the substrate surface in the space.

98. The method of Example 97, wherein the polymer layer formed on the substrate surface in the space has an entire thickness incorporating the inorganic material.

99. The method of Example 97, wherein the polymer layer formed on the substrate surface in the space has a partial thickness incorporating the inorganic material and a partial thickness not incorporating the inorganic material.

100. The method of any one of Examples 80-99, wherein exposing is performed under a pressure less than 10 atm (atmospheric pressure).

101. The method of any one of Examples 80-100, wherein exposing is performed at a temperature greater than 25 degrees Celsius.

102. The method of any one of Examples 80-101, wherein exposing the substrate to one or both of the metal precursor and the oxidizing precursor comprises exposing for a duration between about 1 sec. and about 1000 sec.

103. The method of any one of Examples 80-102, wherein the inorganic material incorporated into the periodically repeating polymer structures comprises a metal nitride.

104. The method of Example 1, wherein exposing is performed under a pressure between about 100 mTorr and about 10 Torr.

105. The method of Example 2, wherein exposing is performed at a temperature lower than about 150 degrees Celsius.

106. The method of Example 1, wherein forming the periodically repeating polymer structures comprises patterning by nanoimprinting.

107. The method of Example 1, wherein forming the periodically repeating polymer structures comprises lithographically patterning.

108. The method of Example 1, wherein the periodically repeating polymer structures are formed of a material whose bulk refractive index is less than the second refractive index and the inorganic material has a bulk refractive index higher than the second refractive index.

109. The method of Example 1, wherein the second refractive index is greater than 1.7 and is greater than the first refractive index by at least 0.2.

110. The method of Example 1, wherein the substrate has a refractive index greater than 1.5.

111. The method of Example 1, wherein the periodically repeating polymer structures comprise a photoresist.

112. The method of Example 1, wherein exposing the substrate to the metal precursor comprises exposing to a precursor comprising a transition metal selected from the group consisting of aluminum, zinc, zirconium, hafnium and titanium.

113. The method of Example 1, wherein exposing the substrate to the metal precursor and the oxidizing precursor comprises exposing at partial pressures of the respective precursor and for durations that are sufficient to saturate exposed surfaces of the periodically repeating polymer structures with at least a monolayer of the inorganic material.

114. The method of Example 1, wherein exposing the substrate to one or both of the metal precursor and the oxidizing precursor comprises exposing for a duration exceeding 1 sec.

115. The method of Example 1, wherein the inorganic material incorporated into the periodically repeating polymer structures comprises a metal oxide.

116. The method of Example 13, wherein the metal oxide comprises a transition metal oxide.

117. The method of Example 14, wherein the metal oxide comprises an oxide selected from the group consisting of aluminum oxide, zinc oxide, zirconium oxide, hafnium oxide and titanium oxide.

118. The method of Example 1, wherein exposing incorporates the inorganic material through exposed surfaces of the periodically repeating polymer structures selectively against exposed surfaces of the substrate.

119. The method of Example 16, wherein forming the periodically repeating polymer structures comprises separating by a space, the space having a substrate surface on which a polymer layer is not disposed thereon, wherein exposing does not result in deposition of the inorganic material on the substrate surface in the space or incorporation of the inorganic material through the substrate surface in the space.

120. The method of Example 16, wherein forming the periodically repeating polymer structures comprises separating by a space, the space having a substrate surface on which a polymer layer is disposed thereon, the polymer layer having a thickness smaller than heights of the periodically repeating polymer structures, wherein exposing incorporates the inorganic material into the polymer layer formed on the substrate surface in the space.

121. The method of Example 18, wherein the polymer layer formed on the substrate surface in the space has an entire thickness incorporating the inorganic material.

122. The method of Example 18, wherein the polymer layer formed on the substrate surface in the space has a partial thickness incorporating the inorganic material and a partial thickness not incorporating the inorganic material.

123. The method of Example 80, wherein exposing is performed under a pressure between about 100 mTorr and about 10 Torr.

124. The method of Example 80, wherein exposing is performed at a temperature lower than about 150 degrees Celsius.

125. The method of Example 80, wherein forming the periodically repeating polymer structures comprises patterning by nanoimprinting.

126. The method of Example 80, wherein forming the periodically repeating polymer structures comprises lithographically patterning.

127. The method of Example 80, wherein the periodically repeating polymer structures are formed of a material whose bulk refractive index is less than the refractive index of the periodically repeating optical structures and the inorganic material has a bulk refractive index higher than the refractive index of the periodically repeating optical structures.

128. The method of Example 80, wherein the refractive index of the periodically repeating optical structures is greater than 1.7 and is greater than the refractive index of the periodically repeating polymer structures by at least 0.2.

129. The method of Example 80, wherein the substrate has a refractive index greater than 1.5.

130. The method of Example 80, wherein the periodically repeating polymer structures comprise a photoresist.

131. The method of Example 80, wherein exposing the substrate to the metal precursor comprises exposing to a precursor comprising a transition metal selected from the group consisting of aluminum, zinc, zirconium, hafnium and titanium.

132. The method of Example 80, wherein exposing the substrate to the metal precursor and the oxidizing precursor comprises exposing at partial pressures of the respective precursor and for durations that are sufficient to saturate exposed surfaces of the periodically repeating polymer structures with at least a monolayer of the inorganic material.

133. The method of Example 80, wherein exposing the substrate to one or both of the metal precursor and the oxidizing precursor comprises exposing for a duration exceeding 1 sec.

134. The method of Example 80, wherein the inorganic material incorporated into the periodically repeating polymer structures comprises a metal oxide.

135. The method of Example 134, wherein the metal oxide comprises a transition metal oxide.

136. The method of Example 135, wherein the metal oxide comprises an oxide selected from the group consisting of aluminum oxide, zinc oxide, zirconium oxide, hafnium oxide and titanium oxide.

137. The method of Example 80, wherein exposing incorporates the inorganic material through exposed surfaces of the periodically repeating polymer structures selectively against exposed surfaces of the substrate.

138. The method of Example 137, wherein forming the periodically repeating polymer structures comprises separating by a space, the space having a substrate surface on which a polymer layer is not disposed thereon, wherein exposing does not result in deposition of the inorganic material on the substrate surface in the space or incorporation of the inorganic material through the substrate surface in the space.

139. The method of Example 137, wherein forming the periodically repeating polymer structures comprises separating by a space, the space having a substrate surface on which a polymer layer is disposed thereon, the polymer layer having a thickness smaller than heights of the periodically repeating polymer structures, wherein exposing incorporates the inorganic material into the polymer layer formed on the substrate surface in the space.

140. The method of Example 139, wherein the layer of polymer layer formed on the substrate surface in the space has an entire thickness incorporating the inorganic material.

141. The method of Example 139, wherein the layer of polymer layer formed on the substrate surface in the space has a partial thickness incorporating the inorganic material and a partial thickness not incorporating the inorganic material.

142. The method of fabricating the optical element according to any one of Examples 1-20 and 50-53, wherein the method further comprises integrating the optical element as part of a head-mounted augmented reality eyewear.

143. The method of fabricating the optical element according to any one of Examples 60-79, wherein the method further comprises integrating the optical element as part of a head-mounted augmented reality eyewear.

144. The method of fabricating the optical element according to any one of Examples 80-103, wherein the method further comprises integrating the optical element as part of a head-mounted augmented reality eyewear.

145. A head-mounted display device configured to project light to an eye of a user to display augmented reality image content, the head-mounted display device comprising:
a frame configured to be supported on a head of the user;
a display disposed on the frame, at least a portion of the display comprising:
one or more waveguides, the one or more waveguides being transparent and disposed at a location in front of the user's eye when the user wears the head-mounted display device such that the transparent portion transmits light from a portion of an environment in front of the user to the user's eye to provide a view of the portion of the environment in front of the user;
one or more light sources; and
an optical element according to any one of Examples 21-34 and 54-56, wherein the one or more waveguides of the display comprises the substrate of the optical element, and wherein the optical element is configured to couple light from the one or more light sources into the one or more waveguides or to couple light out of the one or more waveguides.

146. A head-mounted display device configured to project light to an eye of a user to display augmented reality image content, the head-mounted display device comprising:
a frame configured to be supported on a head of the user;
a display disposed on the frame;
one or more light sources; and
an optical element according to any one of Examples 21-34 and 54-56, wherein the optical element is configured to direct light originating from the one or more light sources into the eye of the user.

147. A head-mounted display device configured to project light to an eye of a user to display augmented reality image content, the head-mounted display device comprising:
a frame configured to be supported on a head of the user;
a display disposed on the frame:
one or more light sources; and
an optical system according to any one of to any one of Examples 35-40, wherein the optical element is configured to direct light originating from the one or more light sources into the eye of the user.

148. A head-mounted display device configured to project light to an eye of a user to display augmented reality image content, the head-mounted display device comprising:
a frame configured to be supported on a head of the user;
a display disposed on the frame:
one or more light sources; and
an optical element according to any one of Examples 41-46 and 57-59, wherein the optical element is configured to direct light originating from the one or more light sources into the eye of the user.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention.

For example, while advantageously utilized with AR displays that provide images across multiple depth planes, the augmented reality content disclosed herein may also be displayed by systems that provide images on a single depth plane, and/or with virtual reality displays. In some embodiments where multiplexed image information (e.g. light of different colors) is directed into a waveguide, multiple optical elements or metasurfaces may be provided on the waveguide, e.g., one optical element or metasurface active for each color of light. In some embodiments, the pitch or periodicity, and/or geometric sizes, of the protrusions forming the optical element or metasurface may vary across a surface thereof. Such an optical element or metasurface may be active in redirecting light of different wavelengths, depending upon the geometries and pitches at the locations where that light impinges on the optical elements or metasurfaces. In some other embodiments, the geometries and pitches of optical element or metasurface features are configured to vary such that deflected light rays, even of similar wavelengths, propagate away from the optical element or metasurface at different angles. It will also be appreciated that multiple separated optical elements or metasurfaces may be disposed across a substrate surface, with each of the optical elements or metasurfaces having the same geometries and pitches in some embodiments, or with at least some of the optical elements or metasurfaces having different geometries and/or pitches from other optical elements or metasurfaces in some other embodiments.

Also, while advantageously applied to displays, such as wearable displays, the optical elements or metasurfaces may be applied to various other devices in which a compact, low-profile light redirecting element is desired. For example, the optical elements or metasurfaces may be applied to form light redirecting parts of optical plates (e.g., glass plates), optical fibers, microscopes, sensors, watches, cameras, and image projection devices generally.

In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

For ease of description, various words indicating the relative positions of features are used herein. For example, various features may be described as being "on," "over," at the "side" of, "higher" or "lower" other features. Other words of relative position may also be used. All such words of relative position assume that the aggregate structure or system formed by the features as a whole is in a certain orientation as a point of reference for description purposes, but it will be appreciated that, in use, the structure may be positioned sideways, flipped, or in any number of other orientations.

In addition, though the invention has been described with reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All suitable combinations and subcombinations of features of this disclosure are intended to fall within the scope of this disclosure.

What is claimed is:

1. A method of fabricating an optical element, comprising:
providing a substrate having a first refractive index, the substrate being transparent in the visible spectrum;
forming, on the substrate, periodically repeating polymer structures having an initial refractive index;
performing a first atomic layer deposition step to form a molecular layer of a first precursor on the periodically repeating polymer structures;
performing a second atomic layer deposition step using a second precursor, which is different from the first precursor, to form a layer of target material on the periodically repeating polymer structures, wherein the periodically repeating polymer structures comprising the layer of target material are configured to diffract visible light and have a second refractive index greater than the first refractive index and greater than the initial refractive index,
wherein performing the first atomic layer deposition step occurs in a reaction chamber, and wherein the method comprises purging, subsequent to performing the first atomic layer deposition step, the reaction chamber of the first precursor, wherein performing the second atomic layer deposition step occurs in the reaction chamber, and wherein the method comprises purging, subsequent to performing the second atomic layer deposition step, the reaction chamber of the second precursor, and wherein performing the first atomic layer deposition step, purging of the first precursor, performing the second atomic layer deposition step, and purging of the second precursor constitute a growth cycle, and the method comprises repeatedly performing the growth cycle until a predetermined thickness of the layer of target material is achieved; and controlling, during the growth cycle, a purge time, a total pressure, a partial pressure, and/or a substrate temperature to control diffusion of the first precursor and the second precursor into the periodically repeating polymer structures.

2. The method of claim 1, wherein the first precursor comprises a metal precursor.

3. The method of claim 2, wherein the metal precursor comprises a transition metal.

4. The method of claim 3, wherein the transition metal comprises Al, Zn, Zr, Hf, Ti, or Ta.

5. The method of claim 2, wherein the metal precursor comprises aluminum oxide, zinc oxide, zirconium oxide, hafnium oxide, titanium oxide, tantalum oxide, or combinations thereof.

6. The method of claim 2, wherein the metal precursor comprises a halide compound.

7. The method of claim 2, wherein the metal precursor comprises an alkyl compound.

8. The method of claim 2, wherein the metal precursor comprises an alkoxide compound.

9. The method of claim 1, wherein the second precursor comprises an oxidizing precursor.

10. The method of claim 9, wherein the oxidizing precursor comprises molecular oxygen, ozone, water, hydrogen peroxide, nitrous oxide, ammonia, or combinations thereof.

11. The method of claim 10, wherein the plurality of functional groups comprises a carbonyl group, a hydroxyl group or a pyridine group.

12. The method of claim 1, wherein the periodically repeating polymer structures comprise a plurality of functional groups configured to react with the first precursor to form an inorganic material.

13. The method of claim 1, wherein at least a portion of the first precursor diffuses into the periodically repeating polymer structures and reacts with a functional group of the periodically repeating polymer structures.

14. The method of claim 13, wherein at least a portion of the second precursor diffuses into the periodically repeating polymer structures and reacts with the first precursor to form the target material.

15. The method of claim 14, wherein the target material is an inorganic material.

16. The method of claim 1, wherein at least a portion of the target material diffuses into the periodically repeating polymer structures after being formed.

* * * * *